(12) United States Patent
Russell et al.

(10) Patent No.: US 12,412,104 B2
(45) Date of Patent: Sep. 9, 2025

(54) GRAPH DATA REPRESENTATION SYSTEMS AND METHODS FOR ELIGIBILITY DETERMINATION AND/OR MONITORING

(71) Applicant: Optum, Inc., Minnetonka, MN (US)

(72) Inventors: Adam Russell, Arlington, MA (US);
Sushma Ambati, Chaska, MN (US);
Robert Kahn Rossmiller, Boston, MA (US); Vezly Gracies, Shrewsbury, MA (US)

(73) Assignee: Optum, Inc., Minnetonka, MN (US)

( * ) Notice: Subject to any disclaimer, the term of this patent is extended or adjusted under 35 U.S.C. 154(b) by 1080 days.

(21) Appl. No.: 17/165,240

(22) Filed: Feb. 2, 2021

(65) Prior Publication Data

US 2022/0245481 A1 Aug. 4, 2022

(51) Int. Cl.
*G06N 5/04* (2023.01)
*G06F 40/279* (2020.01)
*G06N 20/00* (2019.01)

(52) U.S. Cl.
CPC ............. *G06N 5/04* (2013.01); *G06F 40/279* (2020.01); *G06N 20/00* (2019.01)

(58) Field of Classification Search
CPC .......... G06N 5/04; G06N 20/00; G06N 5/022; G06F 40/279
See application file for complete search history.

(56) References Cited

U.S. PATENT DOCUMENTS 9,083,670 B1 7/2015 Boncha et al.
9,218,427 B1 12/2015 Thompson et al.
(Continued)

FOREIGN PATENT DOCUMENTS

WO 2019/220128 A1 11/2019

OTHER PUBLICATIONS

Talukdar, "Topics in Graph Construction for Semi-Supervised Learning", Aug. 27, 2009, Department of Computer & Information Science Technical Reports (CIS) University of Pennsylvania Year 2009, pp. 1-22 (Year: 2009).*
(Continued)

*Primary Examiner* — Van C Mang
(74) *Attorney, Agent, or Firm* — Alston & Bird LLP

(57) ABSTRACT

Embodiments of the present disclosure provide methods, apparatus, systems, computing devices, computing entities, and/or the like for processing an inclusion of an entity for an event. In accordance with one embodiment, a method is provided that includes: determining whether a graph representation data object comprises an inbound edge connecting an entity node representing the entity with an event node representing the event; and responsive to determining the graph representation data object comprises the inbound edge, performing an action involving inclusion of the entity for the event. The inbound edge is generated via an inbound edge generator machine learning model configured to: traverse entity and/or inclusion edges of the graph representation data object to identify inclusion and entity edges connected, generate an entity score data object for the entity based at least in part on the inclusion edges, and responsive to the data object satisfying a threshold, generate the inbound edge.

17 Claims, 10 Drawing Sheets

(56) References Cited

U.S. PATENT DOCUMENTS

| | | | |
|---|---|---|---|
| 10,140,273 | B2 | 11/2018 | Biegert et al. |
| 10,395,772 | B1 | 8/2019 | Lucas et al. |
| 10,558,709 | B2 | 2/2020 | O'Connor et al. |
| 2015/0046180 | A1 | 2/2015 | Futscher de Deus et al. |
| 2015/0161346 | A1 | 6/2015 | Hu et al. |
| 2015/0286801 | A1 | 10/2015 | Syeda-Mahmood |
| 2018/0013818 | A1 | 1/2018 | Howard et al. |
| 2018/0373699 | A1 | 12/2018 | McAteer et al. |
| 2019/0287680 | A1 | 9/2019 | O'Connor et al. |
| 2020/0075139 | A1* | 3/2020 | Master ............... G06N 20/00 |
| 2020/0176090 | A1 | 6/2020 | Batra et al. |
| 2020/0176098 | A1 | 6/2020 | Lucas et al. |
| 2020/0218779 | A1 | 7/2020 | Stevens et al. |
| 2020/0356562 | A1 | 11/2020 | Nayak et al. |

OTHER PUBLICATIONS

Gleich, "PageRank Beyond the Web", Jul. 18, 2014, arXiv:1407.5107 v1, pp. 1-37 (Year: 2014).*

Li et al., "A Novel Random Walk and Scale Control Method for Event Recommendation", Jan. 16, 2017, 2016 Intl IEEE Conferences on Ubiquitous Intelligence & Computing, pp. 228-235 (Year: 2017).*

Horowitz et al., "EventAware: A mobile recommender system for events", Apr. 1, 2018, Pattern Recognition Letters, vol. 105, pp. 121-134 (Year: 2018).*

Sun et al., "A personalized event-participant arrangement framework based on user interests in social network", Dec. 24, 2020, Computer Networks, vol. 183, pp. 1-12 (Year: 2020).*

NonFinal Office Action for U.S. Appl. No. 17/165,215, dated Nov. 29, 2022, (17 pages), United States Patent and Trademark Office, US.

"Sarilumab COVID-19—Full Text View," Nih U.S. National Library of Medicine, ClinicalTrials.gov, (9 pages). (Article, Online). [Retrieved from the Internet Oct. 23, 2020] URL: https://clinicaltrials.gov/ct2/show/NCT04327388.

Baset, Aiman G. "Graphical Database Architecture For Clinical Trials," Theses, 322, (2015), (99 pages), North Carolina Agricultural and Technical State University. https://digital.library.ncat.edu/theses/322.

Dörpinghaus, Jens et al. "Knowledge Extraction and Applications Utilizing Context Data In Knowledge Graphs," Proceedings of the Federated Conference On Computer Science and Information Systems, vol. 18, Sep. 1-4, 2019, pp. 265-272. Leipzig, Germany. DOI:10.15439/2019F3. ISSN: 2300-5963 ACSIS.

Ling, Yuan et al. "A Hybrid Approach To Precision Medicine-Related Biomedical Article Retrieval and Clinical Trial Matching," Text Retrieval Conference (TREC), Jan. 2017, (10 pages).

Notice of Allowance and Fee(s) Due, for U.S. Appl. No. 17/165,215, dated Apr. 13, 2023, (8 pages), United States Patent and Trademark Office, US.

* cited by examiner

GRAPH DATA REPRESENTATION SYSTEMS AND METHODS FOR ELIGIBILITY DETERMINATION AND/OR MONITORING

TECHNOLOGICAL FIELD

Embodiments of the present disclosure generally relate to systems and methods for evaluating the eligibility of entities for events through the use of a graph data representation of the entities and event.

BACKGROUND

A need exists in the industry to address technical challenges related to mapping events and entities into a meaningful data representation to convey various attributes and attribute properties the entities possess with respect to criteria for taking part in the events. A further need exists for a meaningful data representation of events and entities that can be used in evaluating the entities with respect to eligibility for involvement in the events. It is with respect to these considerations and others that the disclosure herein is presented.

BRIEF SUMMARY

In general, embodiments of the present disclosure provide methods, apparatus, systems, computing devices, computing entities, and/or the like for processing an inclusion of an entity for an event. In accordance with one aspect of the present disclosure, a method is provided. In various embodiments, the method comprises: determining, via one or more processors, whether a graph representation data object comprises an inbound edge connecting an entity node representing the entity with an event node representing the event; and responsive to determining the graph representation data object comprises the inbound edge, performing one or more inclusion-based actions related to inclusion of the entity for the event, wherein: the graph representation data object comprises: (i) a plurality of attribute nodes in which each attribute node of the plurality of attribute nodes represents an attribute and comprises an attribute property, (ii) a plurality of inclusion edges in which each inclusion edge of the plurality of inclusion edges connects the event node and an attribute node of the plurality of attribute nodes to indicate an association with the attribute property for the attribute node for being included for the event, and (iii) a plurality of entity edges for the entity in which each entity edge of the plurality of entity edges connects the entity node and an attribute node of the plurality of attribute nodes to indicate an association of the attribute property for the attribute node with the entity, and the inbound edge connecting the entity node with the event node is generated via an inbound edge generator machine learning model that is configured to: (i) traverse at least one of the plurality of entity edges for the entity or the plurality of inclusion edges to identify one or more inclusion edges of the plurality of inclusion edges connected to one or more attribute nodes of the plurality of attribute nodes connected to one or more entity edges of the plurality of entity edges for the entity, (ii) generate an entity score data object for the entity based at least in part on the one or more inclusion edges, and (iii) responsive to the entity score data object satisfying a score threshold, generate the inbound edge.

In accordance with another aspect of the present disclosure, an apparatus is provided. In various embodiments, the apparatus includes at least one processor and at least one memory including program code. The at least one memory and the program code are configured to, with the at least one processor, cause the apparatus to at least: determine whether a graph representation data object comprises an inbound edge connecting an entity node representing the entity with an event node representing the event; and responsive to determining the graph representation data object comprises the inbound edge, perform one or more inclusion-based actions related to inclusion of the entity for the event, wherein: the graph representation data object comprises: (i) a plurality of attribute nodes in which each attribute node of the plurality of attribute nodes represents an attribute and comprises an attribute property, (ii) a plurality of inclusion edges in which each inclusion edge of the plurality of inclusion edges connects the event node and an attribute node of the plurality of attribute nodes to indicate an association with the attribute property for the attribute node for being included for the event, and (iii) a plurality of entity edges for the entity in which each entity edge of the plurality of entity edges connects the entity node and an attribute node of the plurality of attribute nodes to indicate an association of the attribute property for the attribute node with the entity, and the inbound edge connecting the entity node with the event node is generated via an inbound edge generator machine learning model that is configured to: (i) traverse at least one of the plurality of entity edges for the entity or the plurality of inclusion edges to identify one or more inclusion edges of the plurality of inclusion edges connected to one or more attribute nodes of the plurality of attribute nodes connected to one or more entity edges of the plurality of entity edges for the entity, (ii) generate an entity score data object for the entity based at least in part on the one or more inclusion edges, and (iii) responsive to the entity score data object satisfying a score threshold, generate the inbound edge.

In accordance with yet another aspect of the present disclosure, a computer program product is provided. In particular embodiments, the computer program product includes a non-transitory computer storage medium having instructions stored therein. The instructions being configured to cause one or more computer processors to at least perform operations configured to: determine whether a graph representation data object comprises an inbound edge connecting an entity node representing the entity with an event node representing the event; and responsive to determining the graph representation data object comprises the inbound edge, perform one or more inclusion-based actions related to inclusion of the entity for the event, wherein: the graph representation data object comprises: (i) a plurality of attribute nodes in which each attribute node of the plurality of attribute nodes represents an attribute and comprises an attribute property, (ii) a plurality of inclusion edges in which each inclusion edge of the plurality of inclusion edges connects the event node and an attribute node of the plurality of attribute nodes to indicate an association with the attribute property for the attribute node for being included for the event, and (iii) a plurality of entity edges for the entity in which each entity edge of the plurality of entity edges connects the entity node and an attribute node of the plurality of attribute nodes to indicate an association of the attribute property for the attribute node with the entity, and the inbound edge connecting the entity node with the event node is generated via an inbound edge generator machine learning model that is configured to: (i) traverse at least one of the plurality of entity edges for the entity or the plurality of inclusion edges to identify one or more inclusion edges of the plurality of inclusion edges connected to one or more attribute nodes of the plurality of attribute nodes connected to one or more entity edges of the plurality of entity edges for the entity, (ii) generate an entity score data object for the entity based at least in part on the one or more inclusion edges, and (iii) responsive to the entity score data object satisfying a score threshold, generate the inbound edge.

In particular embodiments, the one or more inclusion-based actions may comprise generating an inclusion-based interface identifying the entity as eligible to be included in the event and providing the inclusion-based interface for display via an end-user computing device. In addition, in particular embodiments, the graph representation data object may further comprise a plurality of exclusion edges in which each exclusion edge of the plurality of exclusion edges connects the event node and an attribute node of the plurality of attribute nodes to indicate an association with the attribute property for the attribute node for being excluded from the event. In some embodiments, the inbound edge generator machine learning model may be further configured to traverse at least one of the plurality of entity edges for the entity or the plurality of exclusion edges to identify one or more exclusion edges of the plurality of exclusion edges connected to one or more attribute nodes of the plurality of attribute nodes not connected to one or more entity edges of the plurality of entity edges for the entity and generate the entity score data object for the entity based at least in part on the one or more inclusion edges and the one or more exclusion edges. In some embodiments, the inbound edge generator machine learning model may generate the entity score data object by dividing a sum of a number of the one or more inclusion edges by a sum of a number of the plurality of inclusion edges. In other embodiments, the inbound edge generator machine learning model may generate the entity score data object by dividing a sum of a number of the one or more inclusion edges and the one or more exclusion edges by a sum of a number of the plurality of inclusion edges and the plurality of exclusion edges.

In particular embodiments, each of the plurality of inclusion edges is generated for the graph representation data object by processing one or more inclusion criteria data objects via a natural language processing machine learning model configured to perform natural language processing on the one or more inclusion criteria data objects to identify at least one of attributes or attribute properties from the one or more inclusion criteria data objects. In addition, in some embodiments, at least one of the plurality of attribute nodes is generated for the graph representation data object by processing the one or more inclusion criteria data objects.

Embodiments of the present disclosure also provide methods, apparatus, systems, computing devices, computing entities, and/or the like for processing an event score data object generated for an occurrence of an event involving a plurality of entities taking part in the event. In accordance with one aspect of the present disclosure, a method is provided. In various embodiments, the method comprises: generating, via one or more processors, the event score data object for the occurrence of the event using a graph representation data object, wherein: the graph representation data object comprises (i) a plurality of entity nodes representing the plurality of entities taking part in the event, (ii) a plurality of attribute nodes in which each attribute node of the plurality of attribute nodes represents an attribute and comprises an attribute property, and (ii) a plurality of entity edges in which each entity edge of the plurality of entity edges connects one entity node of the plurality of entity nodes and one attribute node of the plurality of attribute nodes to indicate an association of the attribute property for the attribute node with the entity taking part in the event represented by the entity node, and the event score data object is generated via an event score machine learning model that is configured to: (i) traverse the plurality of entity edges in the graph representation data object to identify one or more attribute of interest nodes from the plurality of attributes nodes for each entity of the plurality of entities taking part in the event in which each of the one or more attribute of interest nodes represents an attribute of interest and is connected to one of the plurality of entity edges connected to the entity node representing the entity from the plurality of entity nodes, and (ii) generate the event score data object for the occurrence of the event based at least in part on the one or more attribute of interest nodes identified for each entity of the plurality of entities taking part in the event; and performing one or more event-based actions based at least in part on the event score data object generated for the occurrence of the event.

In accordance with another aspect of the present disclosure, an apparatus is provided. In various embodiments, the apparatus includes at least one processor and at least one memory including program code. The at least one memory and the program code are configured to, with the at least one processor, cause the apparatus to at least: generate the event score data object for the occurrence of the event using a graph representation data object, wherein: the graph representation data object comprises (i) a plurality of entity nodes representing the plurality of entities taking part in the event, (ii) a plurality of attribute nodes in which each attribute node of the plurality of attribute nodes represents an attribute and comprises an attribute property, and (ii) a plurality of entity edges in which each entity edge of the plurality of entity edges connects one entity node of the plurality of entity nodes and one attribute node of the plurality of attribute nodes to indicate an association of the attribute property for the attribute node with the entity taking part in the event represented by the entity node, and the event score data object is generated via an event score machine learning model that is configured to: (i) traverse the plurality of entity edges in the graph representation data object to identify one or more attribute of interest nodes from the plurality of attributes nodes for each entity of the plurality of entities taking part in the event in which each of the one or more attribute of interest nodes represents an attribute of interest and is connected to one of the plurality of entity edges connected to the entity node representing the entity from the plurality of entity nodes, and (ii) generate the event score data object for the occurrence of the event based at least in part on the one or more attribute of interest nodes identified for each entity of the plurality of entities taking part in the event; and perform one or more event-based actions based at least in part on the event score data object generated for the occurrence of the event.

In accordance with yet another aspect of the present disclosure, a computer program product is provided. In particular embodiments, the computer program product includes a non-transitory computer storage medium having instructions stored therein. The instructions being configured to cause one or more computer processors to at least perform operations configured to: generate the event score data object for the occurrence of the event using a graph representation data object, wherein: the graph representation data object comprises (i) a plurality of entity nodes representing the plurality of entities taking part in the event, (ii) a plurality of attribute nodes in which each attribute node of the plurality of attribute nodes represents an attribute and comprises an attribute property, and (ii) a plurality of entity edges in which each entity edge of the plurality of entity edges connects one entity node of the plurality of entity nodes and one attribute node of the plurality of attribute nodes to indicate an association of the attribute property for the attribute node with the entity taking part in the event represented by the entity node, and the event score data object is generated via an event score machine learning model that is configured to: (i) traverse the plurality of entity edges in the graph representation data object to identify one or more attribute of interest nodes from the plurality of attributes nodes for each entity of the plurality of entities taking part in the event in which each of the one or more attribute of interest nodes represents an attribute of interest and is connected to one of the plurality of entity edges connected to the entity node representing the entity from the plurality of entity nodes, and (ii) generate the event score data object for the occurrence of the event based at least in part on the one or more attribute of interest nodes identified for each entity of the plurality of entities taking part in the event; and perform one or more event-based actions based at least in part on the event score data object generated for the occurrence of the event.

For instance, in various embodiments, the one or more event-based actions comprise generating an event-based interface comprising a ranking of a plurality of occurrences of events comprising the occurrence of the event based at least in part on a plurality of event score data objects comprising the event score data object generated for the plurality of occurrences of events and providing the event-based interface for display via an end-user computing device. In various embodiments, each of the attribute properties for the one or more attribute of interest nodes identified for each entity of the plurality of entities represents an attribute property developed by the entity as a result of taking part in the event. In addition, in various embodiments, each of the one or more attributes of interest nodes identified for each entity node of the plurality of entity nodes comprises a weighted value and the event score data object is generated based at least in part on the weighted value for each of the one or more attributes of interest nodes. For instance, in some embodiments, the event score data object is generated by dividing a sum of a number of the plurality of entities taking part in the event by a sum of the weighted value for each of the one or more attributes of interest nodes identified for each entity node of the plurality of entity nodes.

BRIEF DESCRIPTION OF THE SEVERAL VIEWS OF THE DRAWINGS

Figure 1:
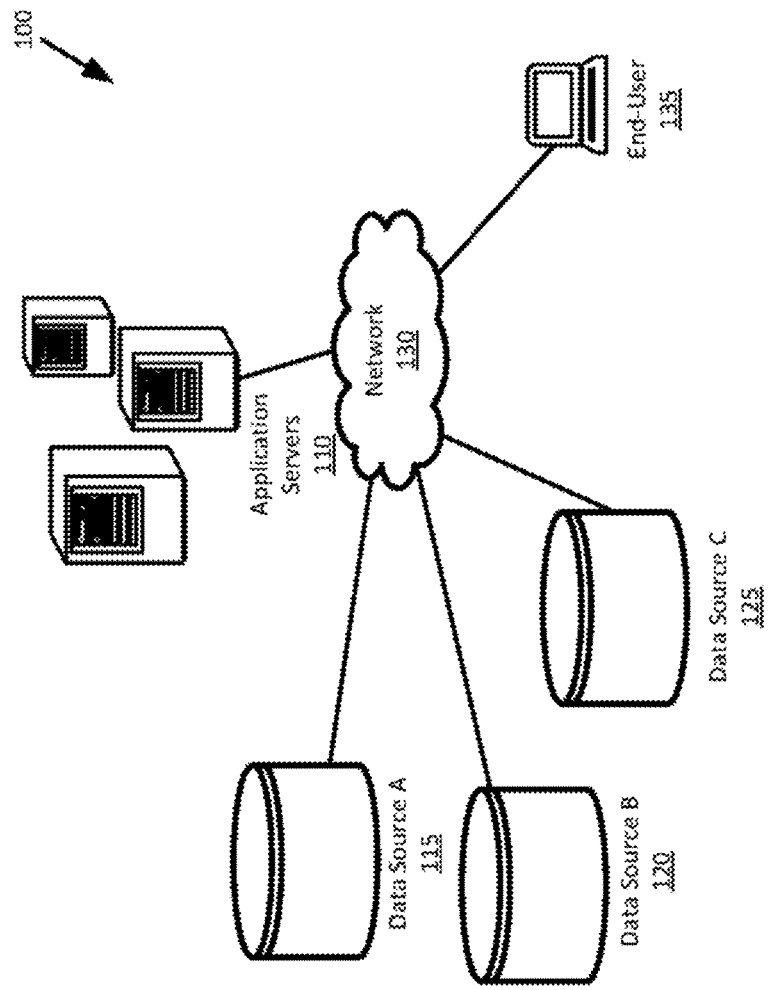
Figure 2:
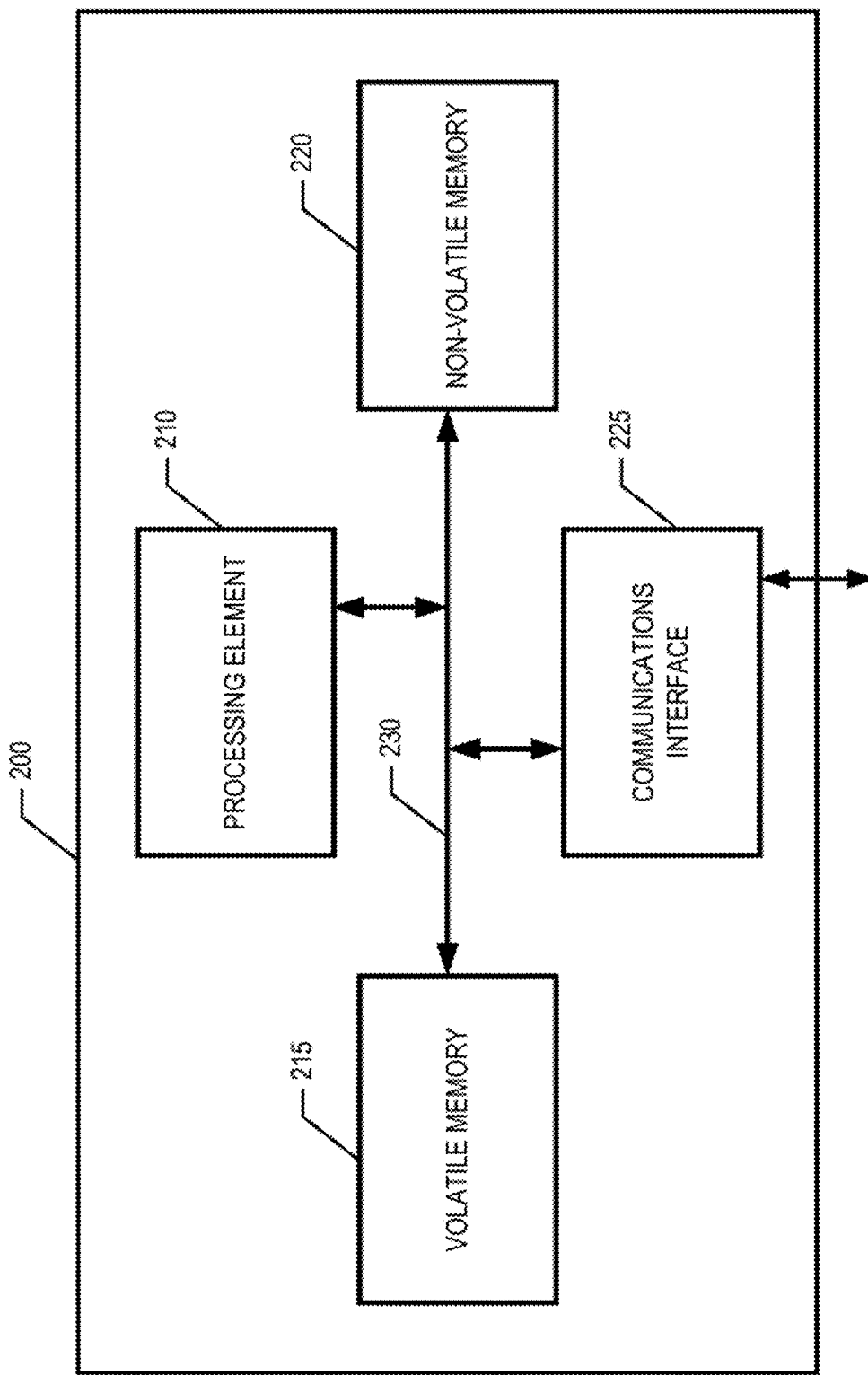
Figure 3:
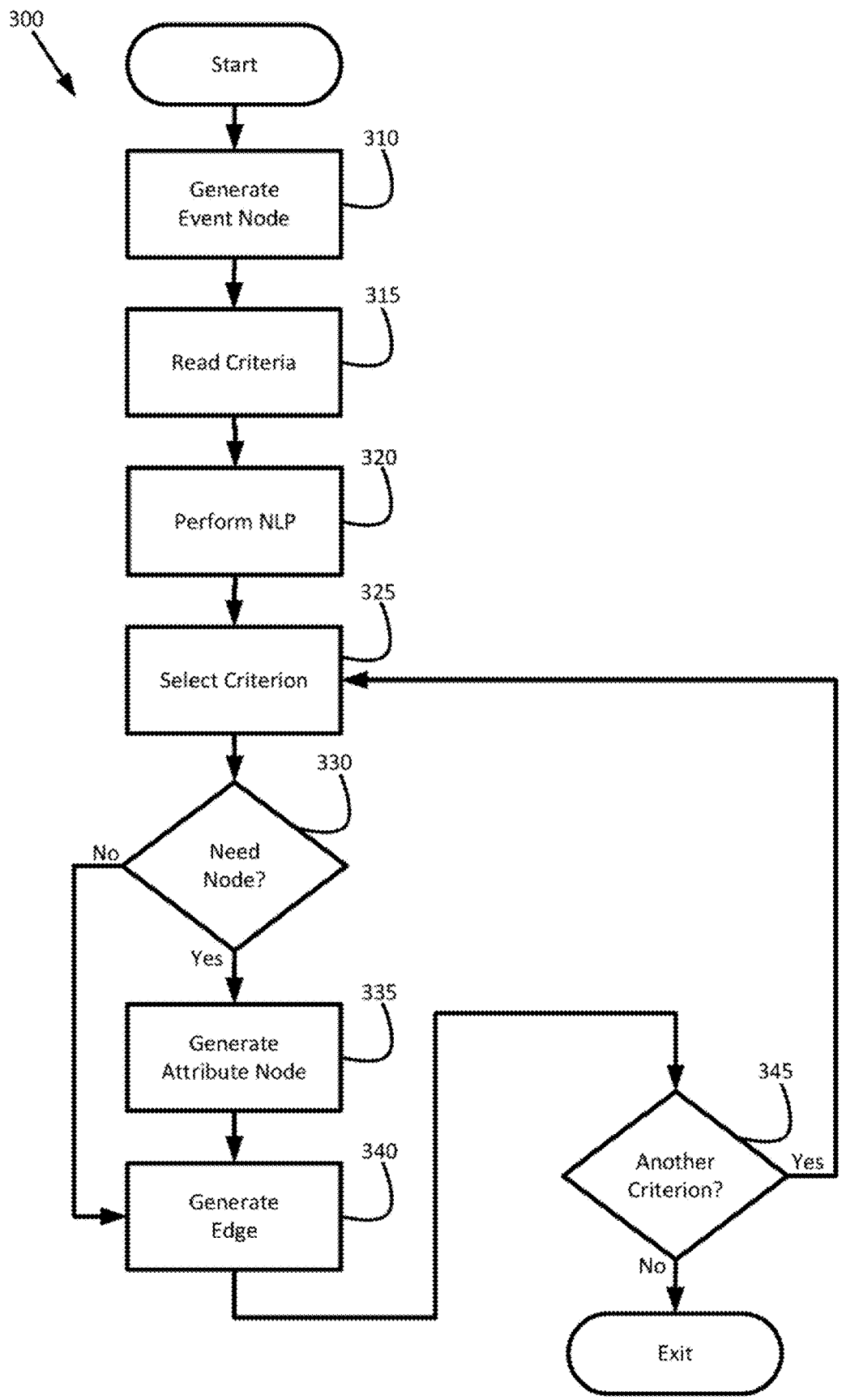
Figure 4:
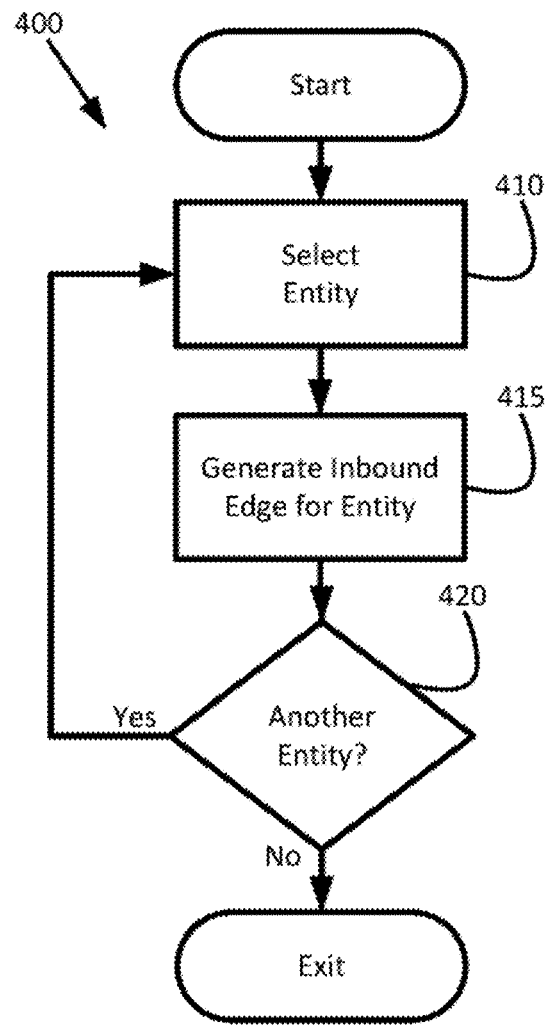
Figure 5:
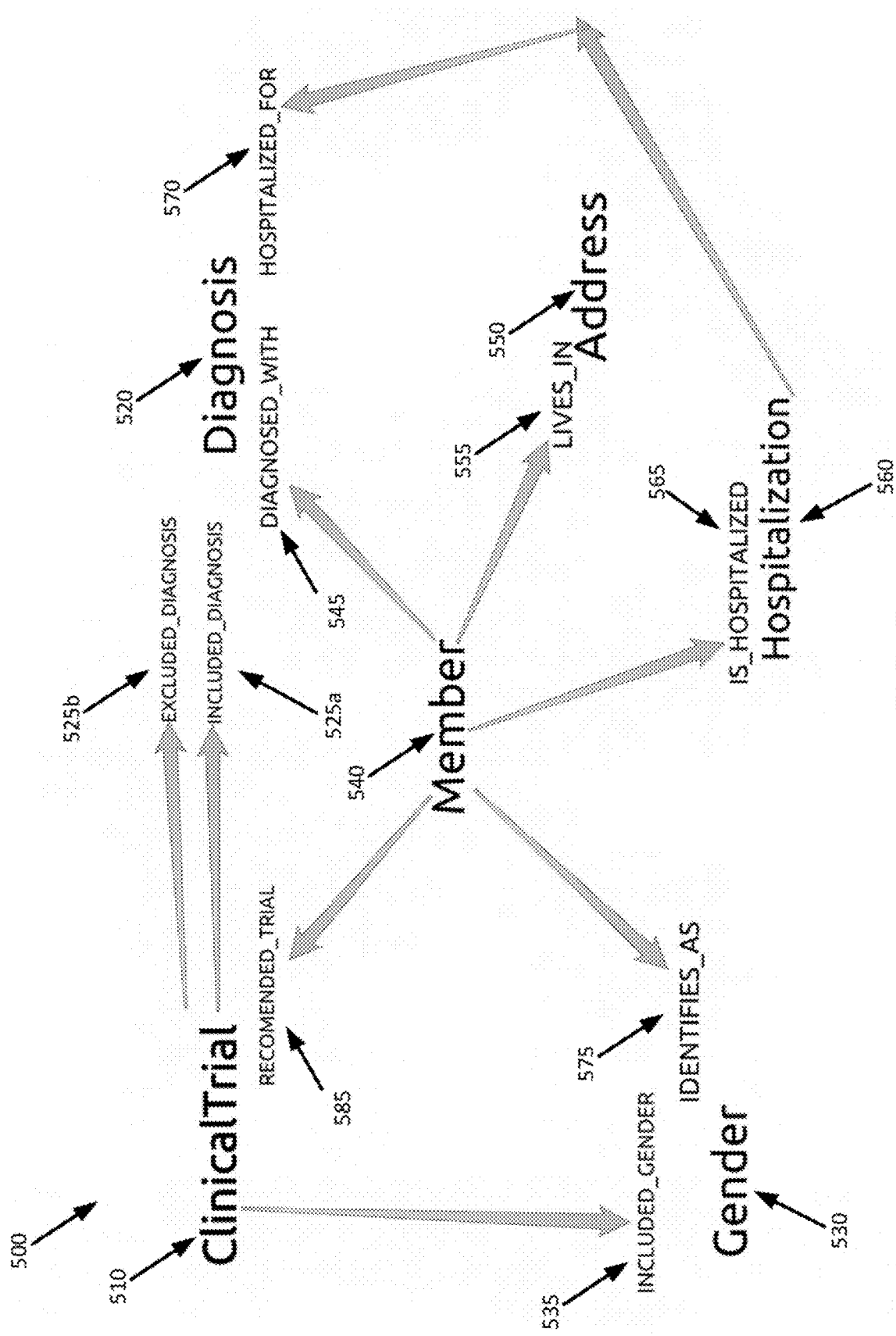
Figure 6:
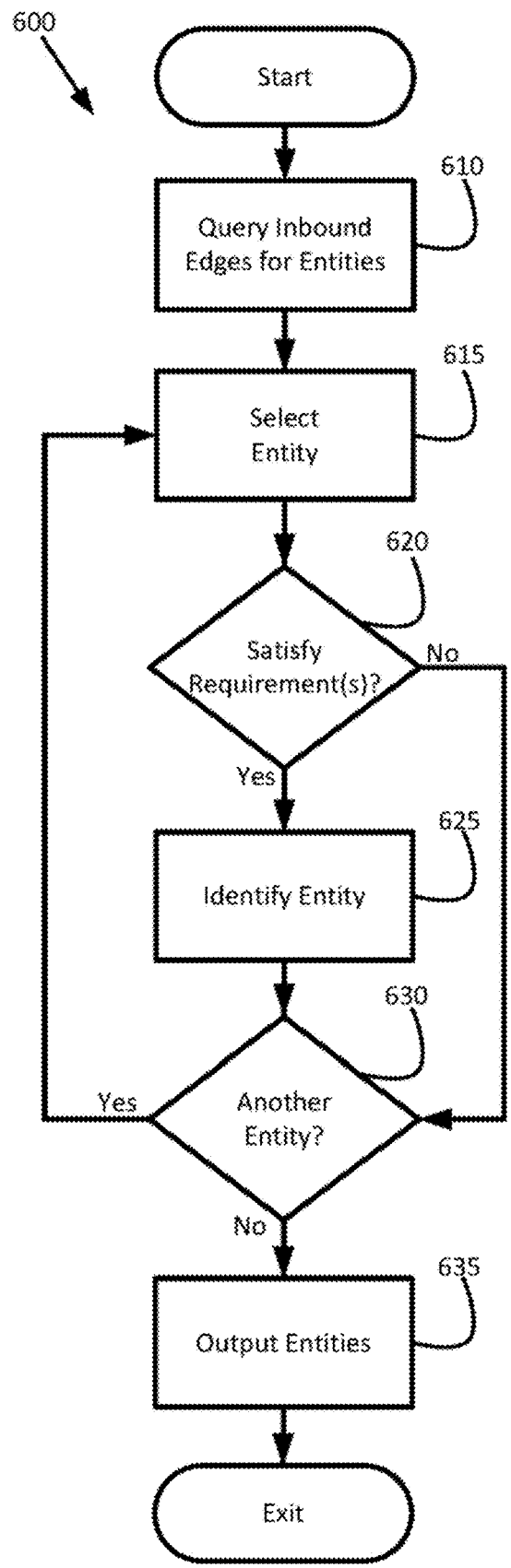
Figure 7:
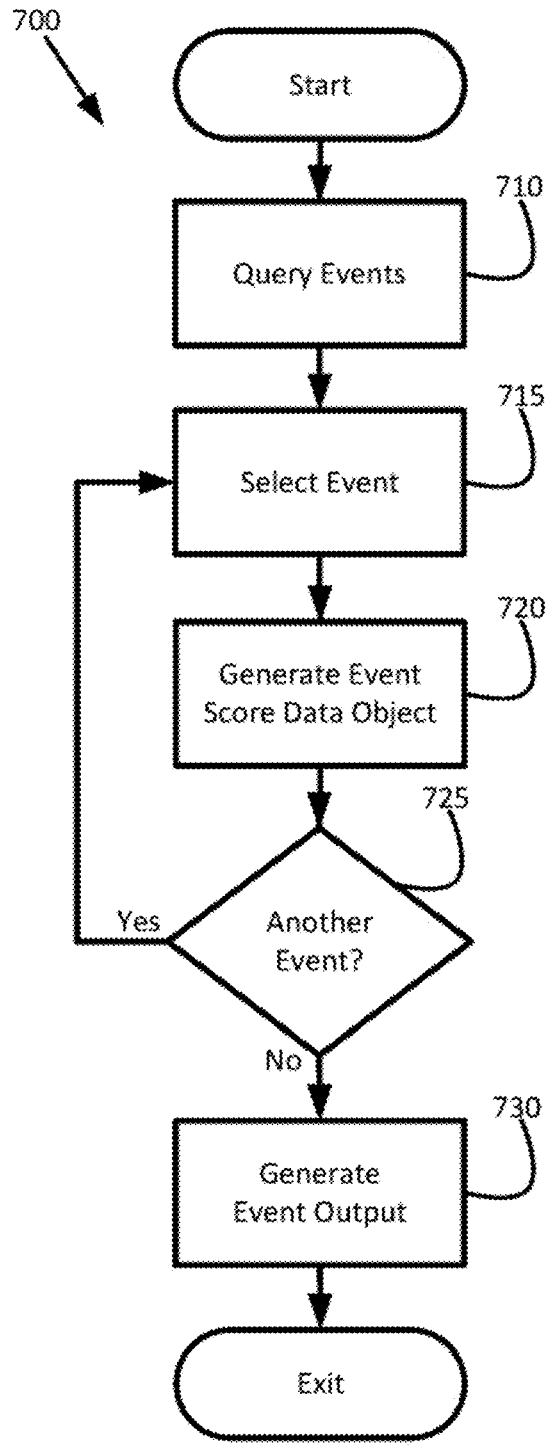
Figure 8:
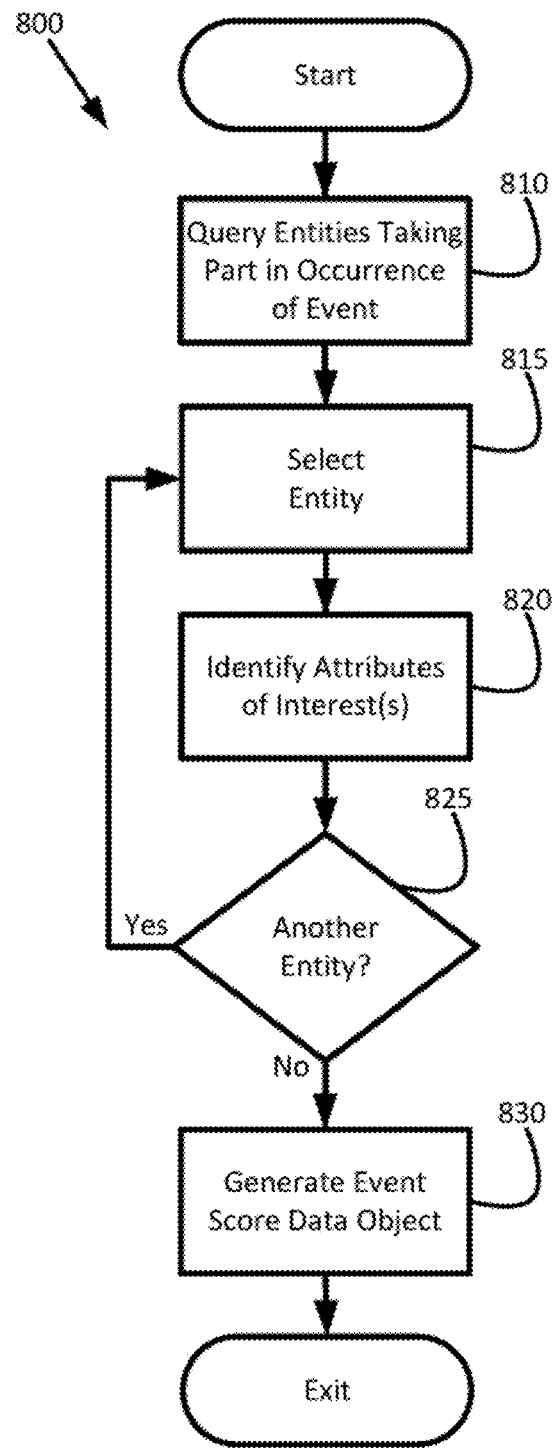
Figure 9:
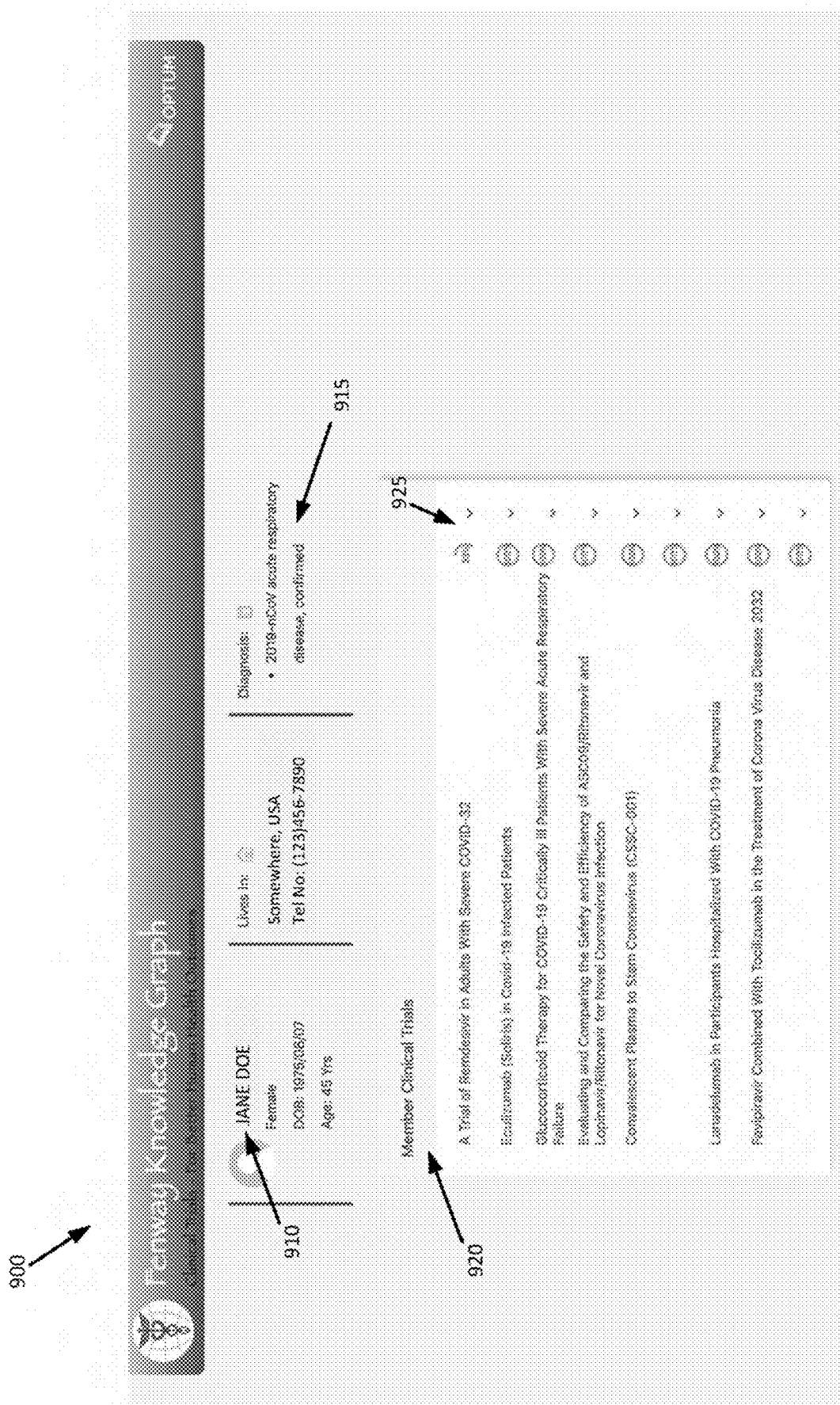
Figure 10:
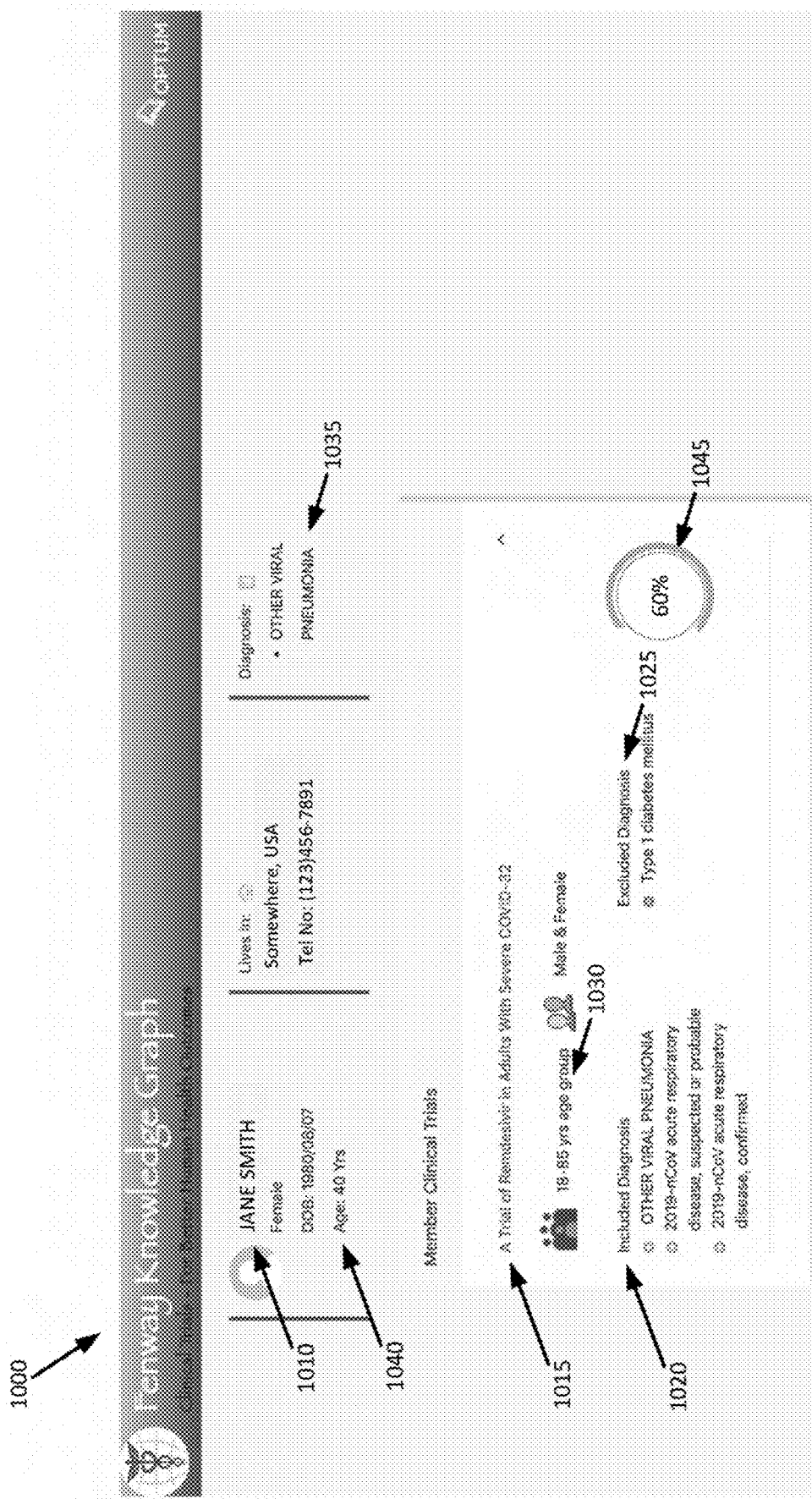

Having thus described the disclosure in general terms, reference will now be made to the accompanying drawings, which are not necessarily drawn to scale, and wherein:

FIG. 1 is a diagram of a system architecture that can be used in conjunction with various embodiments of the present disclosure;

FIG. 2 is a schematic of a computing entity that may be used in conjunction with various embodiments of the present disclosure;

FIG. 3 is a process flow for generating an event node and associated inclusion and/or exclusion edges in accordance with various embodiments of the present disclosure;

FIG. 4 is a process flow for generating an inbound edge for connecting an entity and event in accordance with various embodiments of the present disclosure;

FIG. 5 is an example of a graph representation configuration in accordance with various embodiments of the present disclosure;

FIG. 6 is a process flow for identifying entities eligible to participate in an event in accordance with various embodiments of the present disclosure;

FIG. 7 is a process flow for evaluating occurrences of one or more events in accordance with various embodiments of the present disclosure;

FIG. 8 is process flow for generating an event score data object for an occurrence of an event in accordance with various embodiments of the present disclosure;

FIG. 9 provides an example of a end-user interface that may be used in accordance with various embodiments of the present disclosure; and FIG. 10 is another example of a end-user interface that may be used in accordance with various embodiments of the present disclosure.

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Definitions of Certain Terms

The term "event" may refer to a happening, occasion, activity, experience, appearance, and/or the like. For example, an event may be a clinical/scientific trial, experiment, testing, or investigation. In another example, an event may be a manufacturing process or sales promotion. Yet, in another example, an event may be a celebration, gathering, trip, and/or the like. Accordingly, an event may involve a professional setting, personal setting, scientific setting, manufacturing setting, and/or the like.

The term "entity" may refer to an object such as a being, person, individual, animal, article, component, product, thing, and/or the like that is independent, separate, and/or has a self-contained existence. As discussed further herein, various embodiments of the disclosure involve identifying entities who/that may be eligible for taking part in different events. For example, particular embodiments may involve identifying individual persons who may be eligible to participate in a clinical trial. In another example, particular embodiments may involve identifying individual components that may be eligible for use in a manufacturing process. Accordingly, taking part in an event may entail being involved in an occurrence of an event such as, for example, participating in the event, being used as an element in constructing and conducting the event, and/or the like.

The term "graph representation data object" may refer to a data object representing data in the form of a graph structure used for representing and storing the data. For instance, in particular embodiments, the graph representation data object may be stored using a graph database. Accordingly, the graph representation data object may include one or more entity nodes used to represent individual entities. In addition, the graph representation data object may include one or more event nodes used to represent individual events. Various embodiments of disclosure involve generating inbound edges connecting entity nodes to event nodes to represent the entities may be eligible for taking part in the corresponding events. Further, the graph representation data object may include one or more attribute nodes that represent attributes, and may identify attribute properties. In particular embodiments, one or more inclusion edges may be generated for an event node, connecting the event node to one or more attribute nodes. Each inclusion edge may indicate an association with the attribute property for the attribute node for being included for the event. Likewise, in particular embodiments, one or more exclusion edges may be generated for an event node, connecting the event node to one or more attribute nodes. Each exclusion edge may indicate an association with the attribute property for the attribute node for being excluded from the event. Finally, the graph representation data object may include one or more entity edges for an entity node, connecting the entity node with one or more attribute nodes. Each entity edge may indicate an association of the attribute property for the attribute node with the entity. As discussed further herein, the graph representation data object may be used in various embodiments for identifying entities who/that may be eligible for taking part in an event. Furthermore, the graph representation data object may be used in various embodiments for evaluating one or more entities' involvement in an occurrence of an event and/or the effectiveness of an event with respect to one or more entities involved in an occurrence of the event.

The term "inbound edge generator machine learning model" may refer to a data object that describes parameters and/or hyper-parameters (e.g., defined operations) of a model that is configured to determine whether to generate an inbound edge connecting an entity node representing an entity to an event node representing an event in a graph representation data object (e.g., in order to represent that the entity may be eligible to participate in the event). In various embodiments, the inbound edge generator machine learning model is configured to traverse one or more entity edges connected to the entity node for the entity and/or one or more inclusion edges connected to the event node for the event in the graph representation data object to identify the inclusion edges for the event connected to attribute nodes that are connected to entity edges for the entity. In addition, in some embodiments, the inbound edge generator machine learning model may be configured to traverse the entity edges connected to the entity node for the entity and/or exclusion edges connected to the event node for the event to identify the exclusion edges connected to attribute nodes not connected to entity edges for the entity. Accordingly, in particular embodiments, the inbound edge generator machine learning model may be configured to conduct the traversal of the entity edges, inclusion edges, and/or exclusion edges by employing an algorithm configured for visiting the edges and attribute nodes using a methodical and/or logical approach. For example, the inbound edge generator machine learning model may be configured to perform the traversal as a depth-first search or breadth-first search. In some embodiments, the inbound edge generator machine learning model may generate an entity score data object for the entity based at least in part on the inclusion and/or exclusion edges identified for the entity. For example, the entity score data object may represent a value calculated based at least in part on the inclusion and/or exclusion edges identified for the entity. In some embodiments, the inbound edge generator machine learning model may generate the inbound edge connecting the entity node representing the entity and the event node representing the event in response to the entity score data object satisfying a score threshold. Accordingly, the generated inbound edge can represent that the entity may be eligible for taking part in the event.

The term "natural language processing machine learning model" may refer to a data object that describes parameters and/or hyper-parameters (e.g., defined operations) of a model that is configured to perform natural language processing on one or more inclusion and/or one or more exclusion criteria data objects to identify attributes and/or attribute properties from the one or more inclusion and/or exclusion criteria data objects that are used in generating inclusion and/or exclusion edges for an event node in a graph representation data object. An inclusion criteria data object may be a data object representing an attribute and/or attribute property of an entity for being included for the event. While an exclusion criteria data object may be a data object representing an attribute and/or attribute property of an entity for being excluded from the event. For example, the event may be a clinical trial, and an inclusion data object may indicate criterion that an entity who is a person must be female to be included in the clinical trial. In another example, an exclusion data object may indicate criterion that a person who has been diagnosis with a certain medical condition should be excluded from the clinical trial. In some embodiments, the inclusion and/or exclusion criteria data objects may be data objects providing the criteria in a text format. Accordingly, in these embodiments, the natural language processing machine learning model may be configured to perform natural language processing on the inclusion and/or exclusion criteria data objects to identify the attributes and/or attribute properties via, for example, named entity recognition, text summarization, aspect mining, topic modeling, and/or the like to identify the attributes and/or attributes properties from the inclusion and/or exclusion criteria data objects.

The term "inclusion-based interface" may refer to a data object that describes a user interface that is configured to display an entity as eligible to potentially participate in an event. For example, the inclusion-based interface may be an electronic display viewable on a computer screen identifying an individual as being eligible to participate in a clinical trial. In particular embodiments, the inclusion-based interface may be configured to provide information on an entity with respect to a plurality of events. For example, the inclusion-based interface may provide information on the entity's eligibility with respect each of the plurality of events. In other embodiments, the inclusion-based interface may be configured to identify a plurality of entities that are eligible to potentially participate in a particular event. Thus, in various embodiments, the inclusion-based interface may be configured to be entity-focused or event-focused with respect to providing information on eligibility.

The term "event score machine learning model" may refer to a data object that describes parameters and/or hyper-parameters (e.g., defined operations) of a model that is configured to generate an event score data object for representing the occurrence of an event involving a plurality of entities taking part in the occurrence of the event. For instance, in various embodiments, the event score machine learning model may be configured to traverse the plurality of entity edges in a graph representation data object to identify one or more attribute of interest nodes from a plurality of attributes nodes for each entity of the plurality of entities taking part in the event in which each of the one or more attribute of interest nodes represents an attribute of interest and is connected to one of the plurality of entity edges connected to the entity node representing the entity from the plurality of entity nodes, and generate the event score data object for the occurrence of the event based at least in part on the one or more attribute of interest nodes identified for each entity of the plurality of entities taking part in the event. Accordingly, in particular embodiments, the value for the event score data object for the occurrence of the event that can be used in comparing the occurrence of the event to the occurrences of other events. In particular embodiments, an attribute of interest may represent an attribute developed by an entity as a result of taking part in the occurrence of the event. For example, an attribute of interest may be an adverse effect experienced by individuals as a result of participating in clinical trials. Here, the event score data object generated for two clinical trials taking place may enable comparing the two clinical trials based at least in part on adverse effects being experienced by individuals who are participating in the trials. In some embodiments, each attribute node corresponding to an attribute of interest may define a weighted value representing an importance of the attribute of interest used by the event score machine learning model in generating the event score data object for the occurrence of an event. For instance, returning to the example involving adverse effects being attributes of interest, the adverse effect of developing high blood pressure may be weighted more heavily than the adverse effect of experiencing occasional headaches to indicate a higher consequence of developing this adverse condition as a result of participating in a clinical trial.

The term "event-based interface" may refer to a data object that describes a user interface that is configured to display a ranking for each occurrence of event of a plurality of occurrences of events. For example, the event-based interface may be an electronic display viewable on a computer screen. In particular embodiments, the ranking of the plurality of occurrences of events may be based at least in part on event score data objects generated for the plurality of occurrences of events.

Overview

Embodiments of the disclosure use a novel approach for mapping events and entities into a meaningful data representation in the form of a graph structure to convey various attributes and attribute properties the entities possess with respect to criteria for taking part in the events. Specifically, particular embodiments of the disclosure involve mapping events and criteria for being eligible to participate in the events into a graph representation data object for the events. For example, the events may be clinical trials being conducted by a research hospital and the criteria may be used in identifying patients who may be eligible to participate in the trials.

Here, the events are represented as nodes within the graph representation data object and the criteria are represented as inclusion and/or exclusion edges connecting the events to attribute nodes representing various attributes. Accordingly, in particular embodiments, the inclusion and/or exclusion edges represent attributes and/or attribute properties identified within the criteria for being eligible and/or not eligible to participate in the events. For example, an attribute node may represent a medical condition and the criteria for a clinical trial may identify that a patient needs to be diagnosed with the medical condition to be eligible to participate in the clinical trial. Therefore, this particular requirement found in the criteria may be represented as an inclusion edge in the graph representation data object connecting the event node for the trial to the attribute node for the medical condition.

In addition, particular embodiments of the disclosure involve mapping entities into the graph representation data object in which the entities are represented as nodes. For example, the entities may be patients who are considered for participating in the various clinical trials. Entity edges are included in the graph representation data object connecting the entity nodes representing the entities to various attribute nodes to identify the entities as having the attributes and/or attribute properties associated with the corresponding attribute nodes. For example, an entity edge may be included in the graph representation data object connecting an entity node representing a particular patient with an attribute node representing a medical condition to indicate the patient has been diagnosis as having the medical condition.

In various embodiments, an entity may be evaluated with respect to eligibility to participate in an event using the graph representation data object. Specifically, a traversal of the graph representation data object may be conducted to determine commonalities between the entity and the criteria for eligibility for the event with respect to attribute nodes connected to the entity node representing the entity and event node representing the event via the entity edges and event edges, respectively. In particular embodiments, an inbound edge may be generated in the graph representation data object connecting the entity node representing the entity and the event node representing the event as a result of determining the entity may be eligible to participate in the event. Here, eligibility may be determined based at least in part on the number of attribute nodes that are common between the entity and the event, as well as the importance of attributes that are common between the two.

For instance, returning to the example involving identifying patients who may be eligible to participate in a clinical trial, inbound edges may be generated in the graph representation data object connecting entity nodes representing those patients who have been identified as eligible to potentially participate in the clinical trial and the event node representing the clinical trial. In particular embodiments, inbound edges may only be generated for those patients who are found to have commonality with respect to attribute and/or attribute properties found in the eligibility criteria for the trial that satisfy a threshold. The evaluation for identifying those patients who have commonality with respect to the eligibility criteria for the clinical trial that satisfy the threshold may be performed by traversing the various inclusion and/or exclusion edges and/or entity edges found in the graph representation data object. Accordingly, inclusion of inbound edges connecting only those entities who/that may be eligible for events in particular embodiments can facilitate efficient and effective identification of such entities using the graph representation data object.

Finally, various embodiments of the disclosure also facilitate monitoring of the occurrence of various events involving the involvement/participation of entities through the use of the graph representation data object. In particular embodiments, entity edges and/or attribute nodes may be generated and included in the graph representation data object for one or more entities taking part in an occurrence of an event. Here, in some embodiments, the entity edges represent attributes and/or attribute properties (e.g., attributes of interest) that the entities may have developed as a result of taking part in the event. For example, an entity edge may be generated and included in the graph representation connecting an entity node representing a patient who is participating in a clinical trial to an attribute node representing a medical condition (e.g., high blood pressure) to indicate that the patient has developed the medical condition as an adverse effect as a result of participating in the trial. In addition, in some embodiments, weighted values may be assigned to the entity edges and/or attribute nodes that represent the importance of the corresponding attributes. Such weighted values may then be used in various embodiments for generating event score data objects that can be used in evaluating events and their effects on entities taking part in occurrences of the events. For example, the weighted values may be used in generating an event score data object for a clinical trial representing the severity of the adverse effects experienced by patients as a result of participating in the trial.

Exemplary Technical Contributions

As previously noted, various embodiments of the disclosure provided herein involve mapping events and entities that may participate in the events into a data representation involving a graph structure so that such a representation can be used in easily and efficiently identifying entities that may be eligible in taking part in the events. For instance, in particular embodiments, the data representation may be a graph representation data object in the form of a graph database. Here, the graph representation data object may include event nodes representing different events and entity nodes representing different entities. In addition, the graph representation data object may include one or more attribute nodes representing attributes that may be contributed/possessed by entities and/or required (or not required) to participate in events. Accordingly, the graph representation data object may be constructed with inclusion, exclusion, and/or entity edges representing the association of attributes and/or attribute properties with different events and/or entities. Inclusion of such edges in the graph representation data object in various embodiments allows for efficient and effective identification of entities who/that may be eligible to participate in events in a manner that is not available using conventional processes and systems. In addition, various embodiments involve generating inbound edges within the graph representation data object to represent entities' eligibility with respect to events. Again, such inbound edges in the graph representation data object in various embodiments allows for efficient and effective identification of entities who/that may be eligible to participate in events in a manner that is not available using conventional processes and systems.

The mapping of the events, entities, and corresponding attributes in various embodiments into a graph structure leads to a data representation that is more computationally efficient than found in many other conventional data representations. For instance, the use of a graph representation data object allows for relationships of events and entities to various attributes to take on a priority within the data representation on a level of importance equal to that of the events and entities, themselves. Here, edges are included in the graph representation data object to represent these relationships that allows for the relationships to exist within the graph representation data object in a persistent manner so that they may be queried (e.g., traversed) very quickly. Other conventional data structures such as relational databases do not provide for persistent existence of relationships between data items.

In addition, the use of a graph representation data object in various embodiments allows for a large volume of data representing the events and entities to be represented and managed in an efficient manner. The graph representation data object can facilitate a consistent performance in the computational processing of events and entities for eligibility purposes as relationships grow between events, entities, and/or attributes. Therefore, embodiments of the disclosure allow for the processing of events and entities for eligibility purposes involving big data that may not otherwise be achievable using conventional data representations. For example, queries conducted for relational databases are known to slow as relationships between data items stored within the databases grow. Accordingly, various embodiments of the disclosure overcome this technical disadvantage. In addition, the use of a graph representation data object in various embodiments allows for the data structure and schema to grow as more events, entities, and/or attributes are introduced, providing for a flexible solution.

Thus, various embodiments of the disclosure provided herein address many of the technical disadvantages encountered using conventional data representations, as well as processing and managing such conventional data representations. Specifically, embodiments of the disclosure provide a novel approach in representing events, entities, and/or attributes, as well as the relationships that exist between these events, entities, and/or attributes. This novel approach can enable computing systems to perform tasks that involve identifying, managing, and evaluating various events and eligibility of entities taking part in such evens in a computationally efficient manner that increases performance of these computing systems and as a result, can increase the capacity and efficiency of these computing systems.

In addition, various embodiments of the disclosure enable the identification and management of eligibility of entities for events that is normally handled by humans to be carried out in an automated fashion without human intervention. Thus, the disclosed solution is more effective, accurate, less error prone, and faster than manual implementations. In addition, various embodiments' implementations reduce the manual effort necessary to identify and manage eligibility of entities for events and reduces operational costs and inefficiencies.

Further, the computational processes executed in various embodiments on the graph representation data object can carry out complex mathematical operations that cannot be performed by the human mind. Additionally, the solution can reduce the computational load of various systems used in performing tasks by using the graph representation data object while marginally affecting the effective throughput of these systems. Accordingly, various embodiments of the present disclosure enhance the efficiency and speed of various computing systems, provide the ability to manage eligibility of entities for events that involve very large volumes of data, and make important contributions to various computational tasks that utilize real-time/expediated processing of such data. In doing so, various embodiments of the present disclosure make major technical contributions to improving the computational efficiency and reliability of various automated tasks. This in turn translates to more computationally efficient software systems.

Computer Program Products, Systems, Methods, and Computing Entities

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially, such that one instruction is retrieved, loaded, and executed at a time. In some exemplary embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary System Architectures

FIG. 1 provides an illustration of a system architecture 100 that may be used in accordance with various embodiments of the disclosure. Here, the system architecture 100 includes various components involved in performing tasks involving identifying and managing entity eligibility for various events through the use of a novel approach for representing entities, events, and attributes thereof in a graph data structure. Accordingly, the components may include one or more application servers 110 that may be in communication with and one or more data sources 115, 120, 125 over one or more networks 130. It should be understood that the application server(s) 110 may be made up of several servers, storage media, layers, and/or other components, which may be chained or otherwise configured to interact and/or perform tasks. Specifically, the application server(s) 110 may include any appropriate hardware and/or software for interacting with the data sources 115, 120, 125 as needed to execute aspects of one or more applications for processing data provided from and stored in the data sources 115, 120, 125, as well as handling data access and business logic for such.

In addition, the system architecture 100 may include one or more end-user computing devices 135 used by individuals for conducting one or more processes that use the entity and event information represented in a graph representation data object as described further herein. For example, the end-user computing device(s) 135 may be used by individuals such as clinical trial researchers in conducting an analysis on various entities (e.g., patients) with respect to their eligibility for different clinical trials. Here, the end-user device(s) 135 may be one of many different types of devices such as, for example, a desktop or laptop computer or a mobile device such as a smart phone or tablet. Further, the end-user device(s) 135 may conduct the one or more processes through one or more application programming interfaces (APIs) to interact with the application server(s) 110, as well as access that information on the entities and events represented in the graph representation data object that may be stored within the data sources 115, 120, 125.

As noted, the application server(s) 110, data sources 115, 120, 125, and end-user computing device(s) 135 may communicate with one another over one or more networks 130. Depending on the embodiment, these networks 130 may comprise any type of known network such as a land area network (LAN), wireless land area network (WLAN), wide area network (WAN), metropolitan area network (MAN), wireless communication network, the Internet, etc., or combination thereof In addition, these networks 130 may comprise any combination of standard communication technologies and protocols. For example, communications may be carried over the networks 130 by link technologies such as Ethernet, 802.11, CDMA, 3G, 4G, or digital subscriber line (DSL). Further, the networks 130 may support a plurality of networking protocols, including the hypertext transfer protocol (HTTP), the transmission control protocol/internet protocol (TCP/IP), or the file transfer protocol (FTP), and the data transferred over the networks 130 may be encrypted using technologies such as, for example, transport layer security (TLS), secure sockets layer (SSL), and internet protocol security (IPsec). Those skilled in the art will recognize FIG. 1 represents but one possible configuration of a system architecture 100, and that variations are possible with respect to the protocols, facilities, components, technologies, and equipment used.

Exemplary Computing Entity

FIG. 2 provides a schematic of a computing entity 200 that may be used in accordance with various embodiments of the present disclosure. For instance, the computing entity 200 may be one or more of the application servers 110, and in some instances one or more of the end-user computing devices 135, previously described in FIG. 1. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 200 shown in FIG. 2 may be embodied as a plurality of computing entities, tools, and/or the like operating collectively to perform one or more processes, methods, and/or steps. As just one non-limiting example, the computing entity 200 may comprise a plurality of individual data tools, each of which may perform specified tasks and/or processes.

Depending on the embodiment, the computing entity 200 may include one or more network and/or communications interfaces 225 for communicating with various computing entities, such as by communicating data, content, information, and/or similar terms used herein interchangeably that can be transmitted, received, operated on, processed, displayed, stored, and/or the like. Thus, in certain embodiments, the computing entity 200 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 200 includes or is in communication with one or more processing elements 210 (also referred to as processors, processing circuitry, and/or similar terms used herein interchangeably) that communicate with other elements within the computing entity 200 via a bus 230, for example, or network connection. As will be understood, the processing element 210 may be embodied in several different ways. For example, the processing element 210 may be embodied as one or more complex programmable logic devices (CPLDs), microprocessors, multi-core processors, coprocessing entities, application-specific instruction-set processors (ASIPs), and/or controllers. Further, the processing element 210 may be embodied as one or more other processing devices or circuitry. The term circuitry may refer to an entirely hardware embodiment or a combination of hardware and computer program products. Thus, the processing element 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 210 may be configured for a particular use or configured to execute instructions stored in volatile or non-volatile media or otherwise accessible to the processing element 210. As such, whether configured by hardware, computer program products, or a combination thereof, the processing element 210 may be capable of performing steps or operations according to embodiments of the present disclosure when configured accordingly.

In various embodiments, the computing entity 200 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 220, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 220 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and, in a general sense, to refer to a structured or unstructured collection of information/data that is stored in a computer-readable storage medium.

In particular embodiments, the memory media 220 may also be embodied as a data storage device or devices, as a separate database server or servers, or as a combination of data storage devices and separate database servers. Further, in some embodiments, the memory media 220 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein communicate with various information sources and/or devices in which some or all the information/data required for various embodiments of the disclosure may be stored.

In various embodiments, the computing entity 200 may further include or be in communication with volatile media (also referred to as volatile storage, memory, memory storage, memory circuitry and/or similar terms used herein interchangeably). For instance, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DEVIM, SIMM, VRAM, cache memory, register memory, and/or the like. As will be recognized, the volatile storage or memory media 215 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 210. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 200 with the assistance of the processing element 210 and operating system.

As will be appreciated, one or more of the computing entity's components may be located remotely from other computing entity components, such as in a distributed system. Furthermore, one or more of the components may be aggregated and additional components performing functions described herein may be included in the computing entity 200. Thus, the computing entity 200 can be adapted to accommodate a variety of needs and circumstances.

Exemplary System Operations

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Event Node Module

Turning now to FIG. 3, additional details are provided regarding a process flow for generating an event node representing an event and associated inclusion and/or exclusion edges for a graph representation data object according to various embodiments. FIG. 3 is a flow diagram showing an event node module for performing such functionality according to various embodiments of the disclosure. For example, the flow diagram shown in FIG. 3 may correspond to operations carried out by a processing element 210 in a computing entity 200, such as an application server 110 described in FIG. 1, as it executes operations associated with the event node module stored in the computing entity's volatile and/or nonvolatile memory.

Therefore, the process 300 begins in various embodiments with the event node module generating an event node to represent the event in the graph representation data object in Operation 310. As previously noted, the event may involve a happening, occasion, activity, experience, appearance, and/or the like. For example, the event may involve a sporting activity such as the Boston Marathon. Here, an organizer for the event may be interested in using the graph representation data object in identifying individuals who may be eligible to participate in the marathon. In another example, the event may involve a process for manufacturing a product such as an automobile and an engineer may be interested in using the graph representation data object in evaluating various components that can be used in manufacturing the automobile. For instance, the engineer may be interested in using the graph representation data object in evaluating various grades of steel that can be used in stamping a part for the automobile such as the hood. Yet, in another example, the event may be a clinical trial being conducted for a newly developed vaccine. Here, a researcher may be interested in using the graph representation data object in identifying individuals who may be eligible to participate in the clinical trial. Those of ordinary skill in the art can envision several different events that can be represented in the graph representation data object used in various embodiments in light of this disclosure. However, for purposes of explaining various embodiments of the disclosure, an event involving a clinical trial will be used, although the use of this event should not be viewed as limiting the scope of the disclosure.

Accordingly, the event node module may associate various properties with the event node generated for the event in particular embodiments. For instance, the event node module may provide a name to identify the event associated with the event node, as well as a number of entities that should participate in the event. For example, the event node module may provide the name phase one clinical trial for C29 flu vaccine for the event node, and may identify that the trial is to involve one hundred and fifty participants.

In addition to the properties, criteria may be defined for the event that is to be used in identifying entities who/that may be eligible in taking part in the event. The criteria may identify attributes and/or attribute properties (conditions) that an entity should have to be included in taking part in the event, as well as attributes and/or attribute properties that if an entity has, should exclude the entity from taking part in the event. Therefore, the criteria may identify one or more inclusion criteria data objects representing attributes and/or attribute properties of an entity for being included for the event. In addition, the criteria may identify one or more exclusion criteria data objects representing attributes and/or attribute properties of an entity for being excluded from the event. For example, an inclusion criteria data object may indicate that an individual should be of an age in the range of twenty-five to fifty to participate in the clinical trial. While an exclusion criteria data object may indicate that an individual who has been diagnosed with high blood pressure should be excluded from taking part in the clinical trial.

Accordingly, in various embodiments, the event node module is configured to generate inclusion and/or exclusion edges connecting the event node for the event to attribute nodes found in the graph representation data object representing the corresponding attributes and/or attribute properties defined in the criteria to represent the inclusion and/or exclusion criteria for the event in the graph representation data object. In particular embodiments, the event node module generates these inclusion and/or exclusion edges from processing one or more inclusion and/or exclusion criteria data objects found in the criteria. Thus, the event node module reads the criteria for the event in Operation 315.

In some embodiments, the inclusion and/or exclusion criteria data objects found in the criteria may be provided in a text format. In particular embodiments, the event node module uses a natural language processing machine learning model configured to perform natural language processing on the inclusion and/or exclusion criteria data objects to identify the attributes and/or attribute properties defined in the criteria. For example, the natural language processing machine learning model may be configured to perform named entity recognition, text summarization, aspect mining, topic modeling, and/or the like to identify the attributes and/or attributes properties from the inclusion and/or exclusion criteria data objects. Therefore, the event node module performs natural language processing on the inclusion and/or exclusion criteria data objects to identify criterion for the event using the natural language processing machine learning model in Operation 320.

For example, an inclusion criteria data object may be defined in a text format as "bone marrow function: neutrophil count≥1,500/uL, platelets≥100,000/uL." Here, the natural language processing machine learning model may be configured to identify neutrophil count and as a key term and use a clinical ontology to recognize the key term as a lab test entity. The natural language processing machine learning model may be further configured to understand the value found to the right of the mathematical symbol ≥ is a threshold value. Therefore, in this example, the event node module (via the natural language processing machine learning model) may recognize the attribute neutrophil count and attribute property of greater than or equal to 1,500/uL as inclusion criterion for being eligible to participate in the clinical trial.

Once the individual inclusion and/or exclusion criterion have been recognized, the event node module generates the appropriate edges and attribute nodes (if needed) for each of the criterion in the graph representation data object. Therefore, the event node module selects a criterion in Operation 325. The event node module then determines whether an attribute node needs to be generated in the graph representation data object for the criterion in Operation 330. For example, the criterion may be the attribute neutrophil count and attribute property of greater than or equal to 1,500/uL. Therefore, if the graph representation data object does not currently have an attribute node representing the attribute neutrophil count having an attribute property defined as greater than or equal to 1,500/uL, then the event node module determines that such an attribute node needs to be generated in the graph representation data object. If that is the case, then the event node module generates the attribute node for the criterion in Operation 335.

At that point, the event node module generates an inclusion or exclusion edge for the criterion in Operation 340. An inclusion edge represents criterion identifying an attribute and/or attribute property that an entity should have to be eligible to participate in the event. For example, if the criterion is a neutrophil count greater than or equal to 1,500/uL, then an inclusion edge is generated in the graph representation data object for the criterion. Accordingly, the event node module generates the inclusion edge to connect the event node representing the event to the appropriate attribute node representing the attribute identified in the criterion. Therefore, in the example, the inclusion edge indicates that to be eligible to participate in the clinical trial, an entity should have a neutrophil count greater than or equal to 1,500/uL.

Similar to an inclusion edge, an exclusion edge identifies an attribute and/or attribute property that if an entity has, the entity should be excluded from the event. For example, the criterion may indicate that an individual who has been diagnosed with high blood pressure should be excluded from the clinical trial. Therefore, the event node module may generate an exclusion edge for the criterion connecting the event node representing the clinical trial with the attribute node representing high blood pressure. Accordingly, the event node module may be configured to assign a property to the generated edge to identify the edge as either an inclusion or an exclusion edge.

In addition, in some embodiments, the event node module may assign a property identifying a weighted value for the edge indicating the importance of the criterion for the event. For example, the criterion for a clinical trial may indicate that an individual should be diagnosed with a certain medical condition to be eligible to participate in the clinical trial. Therefore, the event node module generates an inclusion edge connecting the event node for the clinical trial with the attribute node for the medical condition. However, the criterion may also indicate that it is of high importance that an individual who participates in the clinical trial be diagnosed with the medical condition. Therefore, the event node module may assign a property identifying a high weighted value to demonstrate the importance of the criterion.

Conversely, the event node module may assign a low weighted value to an edge representing a criterion of less importance. For example, criterion for the clinical trial may also indicate that an individual should be in the age range of twenty-five to fifty to participate in the clinical trial. However, the criterion may indicate that this attribute is of lesser importance and that individuals who are slightly less than twenty-five and/or slightly more than fifty may still participate in the clinical trial. Therefore, the event node module may assign a low weighted value to the inclusion edge representing this criterion to demonstrate a lesser importance of the criterion.

Once the event node module has generated the edge for the criterion, the event node module determines whether the event has another criterion for eligibility in Operation 345. If so, then the event node module returns to Operation 325, selects the next criterion for the event, and generates an edge for the criterion in the same manner as just described. Once the event node module has generated edges for all of the criterion for the event, the process 300 ends. At that point, the event is now represented within the graph representation data object along with the criteria used in identify entities that may be eligible to participate in the event.

Inbound Edge Generation Module

Turning now to FIG. 4, additional details are provided regarding a process flow for generating an inbound edge connecting an entity node representing an entity and an event node representing an event in a graph representation data object according to various embodiments. Accordingly, in particular embodiments, the inbound edge demonstrates the entity has been identified as being eligible to potentially participate in the event. FIG. 4 is a flow diagram showing a inbound edge generation module for performing such functionality according to various embodiments of the disclosure. For example, the flow diagram shown in FIG. 4 may correspond to operations carried out by a processing element 210 in a computing entity 200, such as an application server 110 described in FIG. 1, as it executes operations associated with the inbound edge generation module stored in the computing entity's volatile and/or nonvolatile memory.

The process 400 begins in various embodiments with the inbound edge generation module selecting an entity in Operation 410. For example, the inbound edge generation module may be invoked as a result of an event node for a particular event being generated for the graph representation data object. As a result, the inbound edge generation module may have been invoked to identify the entity nodes representing different entities found in the graph representation data object that may be eligible for taking part in the newly added event. Here, the inbound edge generation module may be provided with one or more specific entities to consider (e.g., a list of potential entities) or the inbound edge generation module may be instructed to consider each of the entities represented in the graph representation data object. Therefore, upon selecting an entity, the inbound edge generation module identifies the corresponding entity node representing the entity in the graph representation data object.

Once the entity node has been identified, in Operation 415, the inbound edge generation module determines whether to generate the inbound edge connecting the selected entity to the event of interest in the graph representation data object, and, if the inbound edge generation module determines it is appropriate to generate the inbound edge connecting the selected entity to the event of interest in the graph representation data object, generates the inbound edge. Accordingly, in various embodiments, the inbound edge generation module performs this operation by utilizing/invoking an inbound edge generator machine learning model.

Here, in particular embodiments, the inbound edge generator machine learning model is configured to traverse the graph representation data object to identify commonalities between attributes and/or attribute properties exhibited by the selected entity and the attributes and/or attribute properties associated with inclusion and/or exclusion criteria for being eligible to participate in the event of interest. As previously described, one or more inclusion and/or exclusion edges are generated in the graph representation data object to represent the various eligibility criteria for an event. The inclusion and/or exclusion edges connect the event node representing the event to various attribute nodes representing attributes and/or attribute properties found in the eligibility criteria.

Likewise, in various embodiments, one or more entity edges are generated in the graph representation data object to represent different attributes and/or attribute properties exhibited by the entity. The entity edges connect the entity node representing the entity to various attribute nodes representing attributes and/or attribute properties exhibited by the entity. For example, if the entity is a female person, then an entity edge may be included in the graph representation data object connecting the entity node for the entity to an attribute node representing gender with the attribute property of female.

Therefore, the inbound edge generator machine learning model may be configured to traverse the various inclusion and/or exclusion edges for the event, as well as the various entity edges for the selected entity, to identify attributes and/or attribute properties in common between the eligibility criteria for the event and those exhibited by the entity. In particular embodiments, the inbound edge generator machine learning model conducts the traversal of the entity edges, inclusion edges, and/or exclusion edges by employing an algorithm configured for visiting the edges and connected attribute nodes using a methodical and/or logical approach. For example, the inbound edge generator machine learning model may be configured to perform the traversal as a depth-first or breadth-first search.

In addition, in particular embodiments, the inbound edge generator machine learning model may be further configured to generate an entity score data object for the selected entity based at least in part on the inclusion and/or exclusion edges identified as exhibited by the selected entity. Here, for example, the entity score data object may represent a value calculated based at least in part on the inclusion and/or exclusion edges identified for the entity. For instance, the entity score data object may be a value calculated based at least in part on the number of inclusion edges for the event that are connected to attribute nodes that are also connected to the selected entity via entity edges. In addition, the value calculated may be based at least in part on the number of exclusion edges for the event that are connected to attribute nodes that are not connected to the selected entity via entity edges. Further, the value calculated may be based at least in part on the weighted values assigned to the various inclusion and/or exclusion edges.

For example, the event may be a clinical trial that includes two inclusion edges in the graph representation data object connecting the event node for the clinical trial to two attribute nodes representing two different medical conditions. In addition, the clinical trial may include two exclusion edges in the graph representation data object connecting the event node for the clinical trial to two attribute nodes representing two other medical conditions. Therefore, the two inclusion edges indicate an individual should be diagnosed with the two medical conditions to be eligible to participate in the clinical trial and the exclusion edges indicate an individual should not be diagnosed with the two other medical conditions to be eligible to participate in the clinical trial. In this example, the inbound edge generator machine learning model may traverse the graph representation data object and identify that the selected entity has entity edges connected to the two attribute nodes representing the two medical conditions connected to the two inclusion edges for the event and an entity edge connected to one of the attribute nodes representing the two medical condition connected to the two exclusion edges for the event. Therefore, the inbound edge generator machine learning model may calculate the value for the entity score data object for the selected entity as 0.75. Here, the calculated value may be based at least in part on the selected entity exhibiting three of the four attributes (having both of the medical conditions associated with the inclusion edges and not having one of the medical conditions associated with the exclusion edges) for being eligible to participate in the clinical trial.

In some embodiments, the inbound edge generator machine learning model may be configured to take into consideration weighted values that are assigned to the inclusion and/or exclusion edges. For instance, returning to the example involving the clinical trial, the first inclusion edge for the first medical condition may have a weighted value of 0.3, the second inclusion edge for the second medical condition may have a weighted value of 0.2, the first exclusion edge for the third medical condition may have a weight value of 0.3, and the second exclusion edge for the fourth medical condition may have a weight value of 0.7. In this example, the selected entity may have been identified as being diagnosed with the first, second, and fourth medical conditions. Therefore, the inbound edge generator machine learning model may calculate the value for the entity score data object for the selected entity as $0.53((0.3+0.2+0.3)/(0.3+0.2+0.3+0.7))$.

Accordingly, in particular embodiments, the inbound edge generator machine learning model may be configured to generate the inbound edge connecting the entity node representing the selected entity and the event node representing the event of interest in response to the entity score data object satisfying a score threshold. Therefore, if the inbound edge generator machine learning model determines the entity score data object satisfies the score threshold, then the inbound edge generator machine learning model generates the inbound edge in the graph representation data object connecting the entity node representing the selected entity and the event node representing the event of interest. Here, in various embodiments, the generated inbound edge represents the selected entity has been identified as eligible to potentially participate in the event of interest. Thus, by using a score threshold and only generating inbound edges for entities that have been identified to a certain level of eligibility to participate in an event of interest, the graph representation data object may avoid including representations linking entities to the event that are of little value in identifying entities to participate in an actual occurrence of the event. Therefore, querying the graph representation data object constructed in such a fashion to identify entities to participate in an actual occurrence of the event may be more efficient and faster than otherwise using a conventional graph representation of the event and entities.

At this point, the inbound edge generation module determines whether another entity has been identified to be considered for generating an inbound edge for the event of interest in Operation 420. If so, then the inbound edge generation module returns to Operation 410, selects the next entity, and performs the operations just described for the newly selected entity. Once all of the identified entities have been considered, the process 400 ends.

Turning briefly to FIG. 5, an example configuration of a graph representation data object 500 is shown that may be generated and used according to various embodiments of the disclosure. Here, the graph representation data object 500 includes an event node 510 representing a clinical trial. In addition, the graph representation data object 500 includes various attribute nodes 520, 530 that are associated with criteria for being eligible to participate in the clinical trial.

Specifically, one or more attribute nodes 520 have been included in the graph representation data object 500 representing one or more medical diagnoses that may be used in identifying individuals (members) who may be eligible to participate in the clinical trial. Accordingly, the medical diagnoses may be used as inclusion criteria and/or exclusion criteria for identifying members who may participate in the clinical trial. Therefore, one or more inclusion edges 525*a* may be provided in the graph representation data object 500 connecting the event node 510 to attribute nodes 520 representing medical diagnoses for members to be included to participate in the clinical trial. Likewise, one or more exclusion edges 525*b* may be provided in the graph representation data object 500 connecting the event node 510 to attribute nodes 520 representing medical diagnoses for members to be excluded from participating in the clinical trial. Each of the attribute nodes 520 may represent a different medical diagnosis and may be associated with one or more attribute properties. For example, one of the attribute nodes 520 may represent a medical diagnosis of high blood pressure. Here, the attribute node 520 may define an attribute property identifying a blood pressure measurement used as a threshold in identifying members as having high blood pressure.

In addition, the graph representation data object 500 includes an attribute node 530 representing criterion for inclusion in the clinical trial in the form of the attribute gender. The attribute node 530 may define a attribute property as a certain gender (e.g., male and/or female). Therefore, the graph representation data object 500 includes an inclusion edge 535 connecting the event node 510 to the attribute node 530 for gender to indicate that a member should be of the certain gender defined for the attribute node 530 to be eligible to participate in the clinical trial.

The graph representation data object 500 also includes entity nodes representing different members who may be eligible to participate in the clinical trial. Here, the graph representation data object 500 includes an entity node 540 for a member who has been diagnosis with one or more of the medical diagnoses represented by the attribute nodes 520 in the graph representation data object 500. Therefore, the graph representation data object 500 includes one or more entity edges 545 connecting the entity node 540 for the member to the corresponding attribute nodes 520 representing the medical diagnoses to associate the member with the medical diagnoses. In addition, the graph representation data object 500 includes an entity edge 575 connecting the entity node 540 for the member to the attribute node 530 representing gender to indicate the member is of the gender type needed to be eligible to participate in the clinical trial.

Further, in this example, the graph representation data object 500 includes an attribute node 560 representing hospitalization. Here, this particular attribute node 560 represents when a member has been hospitalized for a medical reason. The graph representation data object 500 includes an entity edge 565 connecting the entity node 540 for the member to the attribute node 560 for hospitalization to represent in the graph representation data object 500 that the member has been hospitalized. In addition, the graph representation data object 500 includes an attribute edge 570 connecting the attribute node 560 representing hospitalization with an attribute node 520 represent a medical diagnosis. Accordingly, this attribute edge 570 may define one or more edge properties identifying the member to indicate the member was hospitalized for the associated medical diagnosis. Therefore, in various embodiments, the graph representation data object 500 may include one or more edges that indirectly associate an entity (e.g., a member) with an attribute node representing an attribute being used as inclusion and/or exclusion criteria for an event.

Furthermore, the graph representation data object 500 may include one or more attribute nodes representing attributes of entities that do not necessarily represent attributes being used as inclusion and/or exclusion criteria for events. For instance, in the example, the graph representation data object 500 includes an attribute node 550 representing an address such as, for example, a particular city. Here, an entity edge 555 has been included in the graph representation data object 500 connecting the entity node 540 for the member to the attribute node 550 for the address to indicate the member lives at the address (e.g., lives in the city). Such attribute nodes 550 may be use in some instances to enable querying/gathering further information on entities when using the graph representation data object 500 to identify specific entities to participate in an event. For example, the clinical trial may be scheduled to take place in a particular city. Therefore, having an attribute node representing the particular city may enable querying the graph representation data object 500 to identification of those members who are eligible to participate in the clinical trial and who also live in the city.

Finally, as previously discussed, various embodiments of the disclosure (e.g., the inbound edge generation module) involve generating an inbound edge connecting entities nodes to an event node to indicate the entities represented by the connected entity nodes may be eligible to participate in an occurrence of the event. Accordingly, the inbound edge generation module may generate an inbound edge for an entity based at least in part on common attributes exhibited by the member and identified in the inclusion and/or exclusion criteria for the event. Therefore, looking at FIG. 5, the inbound edge generation module may traverse the inclusion and/or exclusion edges 525*a*, 525*b*, 535, for the event node 510 representing the clinical trial, as well as the entity edges 545, 565, 575 for the entity node 540 representing the member, found in the graph representation data object 500 to identify the attribute nodes 520, 530 that are commonly connected to the event node 510 for the clinical trial and the entity node 540 for the member, and generate an inbound edge 585 connecting the event node 510 and entity node 540 based at least in part on an entity score data object generated as described herein.

Entity Identification Module

Turning now to FIG. 6, additional details are provided regarding a process flow for identifying entities as eligible to potentially participate in an event according to various embodiments. FIG. 6 is a flow diagram showing an entity identification module for performing such functionality according to various embodiments of the disclosure. For example, the flow diagram shown in FIG. 6 may correspond to operations carried out by a processing element 210 in a computing entity 200, such as an application server 110 described in FIG. 1, as it executes operations associated with the entity identification module stored in the computing entity's volatile and/or nonvolatile memory.

Accordingly, a party may be interested in conducing an occurrence of an event represented in a graph representation data object. For example, a research hospital may be interested in conducting a clinical trial for a new drug. Here, the research hospital may have constructed a graph representation data object with an event node representing the clinical trial, along with one or more inclusion and/or exclusion edges and corresponding attributes to representing inclusion and/or exclusion criteria for taking part in the clinical trial.

In addition, the graph representation data object may include entity nodes representing different members (patients) who may be available to participate in the clinical trial. Therefore, the research hospital may be interested in using the graph representation data object in identifying specific members to participate in the clinical trial. As previously discussed, in particular embodiments, an inbound edge may be included in the graph representation data object connecting an entity node representing a particular entity (member) to an event node representing a particular event (clinical trial) to represent the entity may be eligible to participate in the event.

Therefore, the process 600 begins in these particular embodiments with the entity identification module querying the graph representation data object to identify the entities represented by entity nodes connected to the event node representing the event of interest via inbound edges in Operation 610. Once the entities have been identified, the entity identification module selects one of the identified entities in Operation 615 and determines whether the selected entity meets requirements set for taking part in the occurrence of the event in Operation 620.

Accordingly, in particular embodiments, requirements may be set for an entity to be eligible to participate in the particular occurrence of the event. For instance, returning to the example involving identifying members to participate in the clinical trial on the new drug, the trial may be coordinated between various clinical locations of the research hospital found in different cities. Therefore, the research hospital may require any members who participate in the clinical trial to live in one of the different cities and/or live within a certain distance from one of the different cities.

In addition, requirements may be established with respect to the various inclusion and/or exclusion criteria set for the event. For example, as previously discussed, an entity score data object may be generated for each entity and used in determining whether to generate an inbound edge for the entity connecting the entity node representing the entity to the event node representing the event node for the event. Here, the entity score data object may be defined as a property for the inbound edge and a requirement may be set identifying a threshold value that the value for the entity score data object must satisfy for the associated entity to participate in the clinical trial.

In some embodiments, the entity identification module may be configured to traverse the entity edges found in the graph representation data object for the selected entity in evaluating whether the select entity meets the requirements set for taking part in the occurrence of the event. In addition, in some embodiments, the entity identification module may be configured to query other sources of data/information used in evaluating whether the selected entity meets the requirements set for taking part in the occurrence of the event. For example, the entity identification module may query lab results for a selected member to determine whether the lab results indicate the member has a certain condition (e.g., blood pressure measurement) that meets an attribute property set for an attribute identified as a requirement for taking part in the occurrence of the event. Those of ordinary skill in the art can envision other requirements and/or sources of data/information that may be used in evaluating an entity in light of this disclosure.

Therefore, if the entity identification module determines the entity satisfies the requirements set for taking part in the occurrence of the event, then the entity identification module identifies the entity as eligible to participate in the occurrence of the event in Operation 625. At that point, the entity identification module determines whether another entity has been identified as eligible to potentially participate in the occurrence of the event in Operation 630. If so, then the entity identification module returns to Operation 615, selects the next entity, and repeats the operations just discussed for the newly selected entity.

Once all of the identified entities have been evaluated, the entity identification module outputs the identified entities for potentially taking part in the occurrence of the event in Operation 635. Accordingly, the output may take different configurations depending on the embodiments. For instance, as discussed further herein, the output may be provided via an inclusion-based interface in some embodiments. For example, the inclusion-based interface may provide a listing of the entities identified as eligible to potentially participate in the occurrence of the event on a display of an end-user computing device 135 being used by an evaluator who is tasked with selecting entities to actually participate in the occurrence of the event. In some embodiments, the output may instead be provided as input to an automated system that is configured to select entities identified in the output to actually participate in the occurrence of the event. In some embodiments, the output may instead be provided as input to an automated system that is configured to generate communications to the entities identified in the output to inquiry if the entities would be interested in taking part in the occurrence of the event. For instance, returning to the example of identifying members to participate in the clinical trial, the output identifying the members who qualify to participate in the clinical trial may be provided as input to an automated system that generates emails to send to the members asking the members if they would be interested in taking part in the clinical trial. Those of ordinary skill in the art can envision other configurations and/or uses of the output identifying the entities eligible to potentially participate in the occurrence of the event in light of this disclosure.

Event Evaluation Module

Turning now to FIG. 7, additional details are provided regarding a process flow for evaluating occurrences of one or more events according to various embodiments. FIG. 7 is a flow diagram showing an event evaluation module for performing such functionality according to various embodiments of the disclosure. For example, the flow diagram shown in FIG. 7 may correspond to operations carried out by a processing element 210 in a computing entity 200, such as an application server 110 described in FIG. 1, as it executes operations associated with the event evaluation module stored in the computing entity's volatile and/or nonvolatile memory.

Accordingly, in various embodiments, a party may be interested in evaluating occurrences of one or more events with respect to attributes exhibited/experienced by entities who are taking part in the occurrences of the event(s). For example, a research hospital may be conducting clinical trials for three new drugs that have been developed to treat a particular medical condition. Here, the research hospital may be interested in the performance of the three different drugs with respect to adverse effects experienced by members who are taking part in the clinical trials as a result of taking part in the trials. Therefore, the research hospital may further develop the graph representation data object to include attribute nodes representing the different adverse effects that are being experienced by members who are taking part in the clinical trials.

For instance, one adverse effect being experienced by members who are taking part in one of the clinical trials is developing headaches. Therefore, an attribute node may be generated in the graph representation data object representing headaches and entity edges may be included connecting entity node representing members who are taking part in the clinical trial and have developed headaches as an adverse effect of taking part in the clinical trial to the attribute node for headaches.

In addition to including attribute nodes for different attributes of interest (e.g., different adverse effects), one or more properties may be defined/assigned to the attribute nodes for the different attributes of interest. For example, a weighted value may be defined for each attribute node to represent the importance of the attribute interest in evaluating the occurrence of the event. For instance, returning to the example involving the clinical trials being conducted on the three new drugs, two adverse effects being experienced by members who are taking part in the clinical trials is development of headaches and development of high blood pressure. Therefore, two attribute nodes may be generated in the graph representation data object for these two attributes of interest and a weighted value may be defined for each attribute node according to the importance of the adverse effect. Here, the development of high blood pressure may be viewed as a more detrimental adverse effect than the development of headaches and as a result, a higher weighted value may be defined for the attribute node representing high blood pressure than the weighted value defined for the attribute node representing headaches. In some embodiments, the weighted value may instead be defined for the corresponding entity edge for an entity to demonstrate the importance of the attribute of interest. This may allow the importance of the various attributes of interest to be identified with respect to individual entities.

Therefore, the process 700 begins in various embodiments with the event evaluation module querying the events involved in the occurrences of interest in Operation 710. For instance, returning to the example involving the research hospital conducting the clinical trials on the three new drugs, the event evaluation module queries the events representing the three clinical trials. The event evaluation module then selects one of the events in Operation 715 and generates an event score data object for the selected event in Operation 720. In particular embodiments, the event evaluation module is configured to generate the event score data object for the selected event by invoking an event score generation module.

As detailed further herein, the event score generation module is configured in particular embodiments to generate the event score data object for the selected event by traversing the graph representation data object to identify attributes of interest associated with entities taking part in the occurrence of the event, and generating the event score data object based at least in part on the identified attributes of interest. For instance, returning to the example involving the clinical trials being conducted for the three new drugs, the event score generation module traverses the entity edges connected to the entities nodes representing the members who are taking part in the currently selected clinical trial to identify attributes nodes connected to the entity edges and representing adverse effects resulting from the members taking part in the clinical trial. The event score generation module then generates the event score data object for the selected clinical trial based at least in part on the attribute nodes identified for each of the members taking part in the clinical trial.

Once the event score data object has been generated for the selected event, the event evaluation module determines whether another event has been queried in Operation 725. If so, then the event evaluation module returns to Operation 715, selects the next event, and generates the event score data object for the newly selected event as described herein. Once an event data score has been generated for each event of interest, the event evaluation generates event output based at least in part on the generated event score data objects in Operation 730.

Accordingly, in various embodiments, the event output may be configured to demonstrate the effectiveness of the occurrence for each event with respect to the attributes of interest. For instance, returning to the example involving the clinical trials being conducted for the three new drugs, the event output may demonstrate the effectiveness of each of the clinical trials being conducted with respect to the adverse effects being experienced by members as a result of taking part in the clinical trials. For example, in some embodiments, the event output may be provided as a ranking of the clinical trials based at least in part on the event score data objects generated for the clinical trials via an event-based interface. Accordingly, the event-based interface may provide a ranking of the three clinical trials with respect to adverse effects that have been developed by members who are taking part in the clinical trials. Such a ranking may enable an evaluator (who is viewing the event-based interface through an end-user computing device 135) to determine the effectiveness of each new drug in treating the medical condition and development of adverse effects by patient who may be taking the drug to treat the medical condition.

Similar to the entities output, the event output may be provided in different configurations and used for different purposes depending on the embodiments. For example, in some embodiments, the event output may be provided as input to one or more automated systems to be using in evaluating the occurrences of the events, and as well as communicating the results of the evaluation. Those of ordinary skill in the art can envision various configurations and/or uses of the event output in light of this disclosure.

Event Score Generation Module

Turning now to FIG. 8, additional details are provided regarding a process flow for generating an event score data object for an occurrence of an event according to various embodiments. FIG. 8 is a flow diagram showing an event score generation module for performing such functionality according to various embodiments of the disclosure. For example, the flow diagram shown in FIG. 8 may correspond to operations carried out by a processing element 210 in a computing entity 200, such as an application server 110 described in FIG. 1, as it executes operations associated with the event score generation module stored in the computing entity's volatile and/or nonvolatile memory.

As previously noted, in various embodiments, the event score generation module may be invoked by the event evaluation module to generate an event score data object for the occurrence of a particular event of interest. However, with that said, the event score generation module may be invoked by a different module, or may be executed as a stand alone module in other embodiments.

The process 800 begins with the event score generation module querying the entity nodes for the entities taking part in the occurrence of the event in Operation 810. Accordingly, in various embodiments, the event score generation module performs this particular operation by receiving and/or accessing information on the entities who/that are taking part in the occurrence of the event and identifying the corresponding entity nodes in the graph representation data object representing the entities identified in the information.

Here, the different entity nodes may define a property identifying the associated entity. In some embodiments, the different entity nodes may identify the entity as taking part in the occurrence of the event.

Once the entity nodes have been queried, the event score generation module selects one of the entities in Operation 815 and identifies the attribute nodes representing attributes of interest in the graph representation data object connected via an entity edge with the entity node representing the selected entity in Operation 820. Here, in particular embodiments, the event score generation module performs these two operations by invoking an event score machine learning model. For instance, returning to the example involving the clinical trials being conducted for the three new drugs, the attributes of interest may identify adverse effects developed by members as a result of taking part in the clinical trial. Therefore, in this example, the event score machine learning model may be configured to traverse the entity edges connected to the entity node representing the selected entity to identify those entity edges connected to attribute nodes representing the adverse effects. Here, each of the entity edges connected to an attribute node representing an adverse effect may define a property identifying whether the member has developed the associated adverse effect as a result of taking part in the clinical trial. For example, the entity edge may define a property provided as a date when the member was diagnosis as having developed the adverse effect. Therefore, if the date is later than the date the clinical trial began, the event score machine learning model may determine that the adverse effect associated with the attribute node connected to the entity edge was developed as a result of the member taking part in the clinical trial.

At this point, the event score machine learning model determines whether another entity has been identified as taking part in the occurrence of the event in Operation 825. If so, then the event score machine learning model returns to Operation 815, selects the next entity (entity node) taking part in the occurrence of the event, and identifies the attributes of interest associated with the newly selected entity as described herein. Once the attributes of interest have been identified for each of the entities taking part in the occurrence of the event, the event score machine learning model generates the event score data object for the occurrence of the event in Operation 830.

Accordingly, the event score generation module may generate the event score data object via the event score machine learning model for the occurrence of the event using various processes and/or calculations depending on the embodiment. For example, in some embodiments, the event score data object may represent a value providing an effectiveness of the occurrence of the event with respect to the attributes of interest. For instance, returning to the example involving the clinical trials being conducted for the three new drugs, the event score data object for one of the clinical trials may represent the degree of adverse effects experienced by members who are taking part in the clinical trial. Here, each of the attribute nodes representing an adverse effect may define a weighted value identifying the significance of developing the adverse effect. The significance may be with respect to how detrimental is development of the adverse effect to a member. Therefore, the weighted value for each adverse effect identified as being developed by a member who is taking part in the clinical trial may be used in generating the event score data object for the clinical trial. Specifically, for example, the event score data object may be generated by dividing a sum of a number of members taking part in the clinical trial by a sum of the weighted value for each of the adverse effects identified for each member taking part in the clinical trial.

Example Interfaces

FIGS. 9 and 10 provides examples of interfaces showing information for an entity with respect to eligibility for events generated in accordance with various embodiments of the disclosure. For instance, the interfaces shown in FIGS. 9 and 10 may be displayed to an individual through an end-user computing device 135. Turning first to FIG. 9, an interface 900 is shown for a member (Jane Doe 910) who may be eligible to participate in one or more clinical trials. The interface 900 displays medical diagnosis 915 for the member, as well as a list of member medical trials 920 that the member may be eligible to participate in. A percentage 925 is provided for each trial in the list 920 that identifies how well the member meets the criteria for taking part in the trial. As previously discussed, this percentage 925 may be determined in various embodiments by traversing inclusion and/or exclusion edges for each trial, along with entity edges for the member found in a graph representation data object containing event nodes representing the different trials and an entity node representing the member to identify attributes nodes representing the criteria for the different trials that are connected with the entity node for the member. The interface 900 shown in FIG. 9 may allow an evaluator to quickly determine which of the member medical trials 920 the member may be best fitted to participate in. In some embodiments, the interface 900 may be configured to allow the individual to select a particular trial shown in the list 920 to look at specific information on the criteria for being eligible to participate in the trial.

Therefore, turning now to FIG. 10, an interface 1000 is provided for a member (Jane Smith 1010) in which the criteria a particular member clinical trial 1015 is being shown. Here, the interface 1000 provides included diagnosis 1020 that identify diagnosis a member may need to have to be eligible to participate in the particular member clinical trial 1015 and excluded diagnosis 1025 that identify diagnosis that if a member has, may exclude the member from participating in the particular member clinical trial 1015. In addition, the criteria identifies an age group 1030 for participating in the particular member clinical trial 1015. In this example, the interface 1000 identifies a medical diagnosis 1035 for the member, as well as the member's age 1040. Therefore, in this instance, the member meets three of the five criteria identified for participating in the particular member clinical trial 1015 (the age group 1030, one of the three included diagnosis 1020, and the excluded diagnosis 1025). Accordingly, the interface 1000 includes an indicator 1045 identifying the member's adherence to the criteria. Therefore, the interface 1000 can allow an individual who is viewing the interface 1000 to quickly look at the member and criteria for participating in the particular member clinical trial 1015 to conduct an evaluation as to whether the member should actually participate in the trial 1015 and what criteria the member does and does not meet.

Conclusion

Many modifications and other embodiments of the disclosure set forth herein will come to mind to one skilled in the art to which these modifications and other embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
   receiving, by one or more processors, a query for an event to a graph representation data object, wherein the graph representation data object (A) represents the event within a queryable graph database based at least in part on an inclusion criteria data object and an exclusion data object and (B) is generated by:
   (i) generating an event node corresponding to the event, and
   (ii) connecting the event node to a first subset of attribute nodes of a plurality of attribute nodes defined by the graph representation data object based at least in part on the inclusion criteria data object and the exclusion data object, wherein:
      (a) each of the plurality of attribute nodes respectively corresponds to an attribute of a plurality of attributes and comprises an attribute property for the attribute,
      (b) the event node is connected to a first attribute node of the first subset of attribute nodes by an inclusion edge that corresponds to the inclusion criteria data object,
      (c) the event node is connected to a second attribute node of the first subset of attribute nodes by an exclusion edge that corresponds to the exclusion data object, and
      (d) the graph representation data object comprises an entity edge for an entity that connects an entity node to a second subset of attribute nodes of the plurality of attribute nodes, and
   (iii) traversing the entity edge, the inclusion edge, and the exclusion edge of the graph representation data object to generate an entity score data object for the entity,
   (iv) responsive to the entity score data object satisfying a score threshold, modifying the graph representation data object by generating an inbound edge between the entity node and the event node, and
   (v) storing the modified graph representation data object within the queryable graph database, wherein the queryable graph database is configured for processing the query based at least in part on the inbound edge; and
   responsive to receiving the query, processing, by the one or more processors and using the graph representation data object, the query by (1) identifying the event node corresponding to the event, (2) identifying the entity using the inbound edge of the event node, and (3) providing the entity as a resolution to the query.

2. The computer-implemented method of claim 1, wherein the entity score data object is generated by dividing a number of shared inclusion edges by a number of inclusion edges.

3. The computer-implemented method of claim 1, wherein the entity score data object is generated by dividing a first sum of a first count of shared inclusion edges and a second count of shared exclusion edges by a second sum of a third count of inclusion edges and a fourth count of exclusion edges.

4. The computer-implemented method of claim 1, wherein:
   the inclusion edge is generated by processing the inclusion criteria data object via a natural language processing machine learning model, and
   the natural language processing machine learning model is configured to perform natural language processing on the inclusion criteria data object to identify a first attribute or a first attribute property from the inclusion criteria data object.

5. The computer-implemented method of claim 4, wherein at least one of the plurality of attribute nodes is generated for the graph representation data object by processing the inclusion criteria data object.

6. The computer-implemented method of claim 1, further comprising:
   determining, using the graph representation data object, the entity as eligible for the event based at least in part on the inbound edge; and
   providing, for display via an end-user computing device, an inclusion-based interface that identifies the entity for the event.

7. A system comprising:
   one or more processors; and
   one or more memories storing processor-executable instructions that, when executed by:
   receiving a query for an event to a graph representation data object, wherein the graph representation data object (A) represents the event within a queryable graph database based at least in part on an inclusion criteria data object and an exclusion data object and (B) is generated by:
   (i) generating an event node corresponding to the event, and
   (ii) connecting the event node to a first subset of attribute nodes of a plurality of attribute nodes defined by the graph representation data object based at least in part on the inclusion criteria data object and the exclusion data object, wherein:
      (a) each of the plurality of attribute nodes respectively corresponds to an attribute of a plurality of attributes and comprises an attribute property for the attribute,
      (b) the event node is connected to a first attribute node of the first subset of attribute nodes by an inclusion edge that corresponds to the inclusion criteria data object,
      (c) the event node is connected to a second attribute node of the first subset of attribute nodes by an exclusion edge that corresponds to the exclusion data object, and
      (d) the graph representation data object comprises an entity edge for an entity that connects an entity node to a second subset of attribute nodes of the plurality of attribute nodes, and
   (iii) traversing the entity edge, the inclusion edge, and the exclusion edge of the graph representation data object to generate an entity score data object for the entity,
   (iv) responsive to the entity score data object satisfying a score threshold, modifying the graph representation data object by generating an inbound edge between the entity node and the event node, and
   (v) storing the modified graph representation data object within the queryable graph database, wherein the queryable graph database is configured for processing the query based at least in part on the inbound edge; and responsive to receiving the query, processing, using the graph representation data object, the query by (1) identifying the event node corresponding to the event, (2) identifying the entity using the inbound edge of the event node, and (3) providing the entity as a resolution to the query.

8. The system of claim 7, wherein the entity score data object is generated by dividing a number of shared inclusion edges by a number of inclusion edges.

9. The system of claim 7, wherein the entity score data object is generated by dividing a first sum of a first count of shared inclusion edges and a second count of shared exclusion edges by a second sum of a third count of inclusion edges and a fourth count of exclusion edges.

10. The system of claim 9, wherein:

the inclusion edge is generated by processing the inclusion criteria data object via a natural language processing machine learning model, and the natural language processing machine learning model is configured to perform natural language processing on the inclusion criteria data object to identify a first attribute or a first attribute property from the inclusion criteria data object.

11. The system of claim 10, wherein at least one of the plurality of attribute nodes is generated for the graph representation data object by processing the inclusion criteria data object.

12. The system of claim 7, wherein the operations further comprise:

determining, using the graph representation data object, the entity as eligible for the event based at least in part on the inbound edge; and providing, for display via an end-user computing device, an inclusion-based interface that identifies the entity for the event.

13. A computer-implemented method comprising:

receiving, by one or more processors and at a queryable graph database, a query associated with an occurrence of an event represented in a graph representation data object of the queryable graph database, wherein the graph representation data object (A) represents the event based at least in part on an inclusion criteria data object and an exclusion data object associated with the event and (B) is generated by:

(i) generating an event node corresponding to the event, (ii) connecting the event node to a first subset of attribute nodes of a plurality of attribute nodes defined by the graph representation data object based at least in part on the inclusion criteria data object and the exclusion data object, wherein:

(a) each of the plurality of attribute nodes respectively corresponds to an attribute of a plurality of attributes and comprises an attribute property for the attribute, (b) the event node is connected to a first attribute node of the first subset of attribute nodes by an inclusion edge that corresponds to the inclusion criteria data object, (c) the event node is connected to a second attribute node of the first subset of attribute nodes by an exclusion edge that corresponds to the exclusion data object, and (d) the graph representation data object comprises an entity edge for an entity that connects an entity node to a second subset of attribute nodes of the plurality of attribute nodes, and (iii) traversing the entity edge, the inclusion edge, and the exclusion edge of the graph representation data object to generate an entity score data object for the entity, (iv) responsive to the entity score data object satisfying a score threshold, modifying the graph representation data object by generating an inbound edge between the entity node and the event node; and responsive to receiving the query, processing, by the one or more processors and using the graph representation data object, the query by (1) identifying the event node corresponding to the event, (2) identifying the entity using the inbound edge of the event node, and (3) providing the entity as a resolution to the query.

14. The computer-implemented method of claim 13, wherein the entity score data object is generated by dividing a number of shared inclusion edges by a number of inclusion edges.

15. The computer-implemented method of claim 13, wherein the entity score data object is generated by dividing a first sum of a first count of shared inclusion edges and a second count of shared exclusion edges by a second sum of a third count of inclusion edges and a fourth count of exclusion edges.

16. The computer-implemented method of claim 15, wherein:

the inclusion edge is generated by processing the inclusion criteria data object via a natural language processing machine learning model, and the natural language processing machine learning model is configured to perform natural language processing on the inclusion criteria data object to identify a first attribute or a first attribute property from the inclusion criteria data object.

17. The computer-implemented method of claim 13, wherein at least one of the plurality of attribute nodes is generated for the graph representation data object by processing the inclusion criteria data object.

* * * * *

UNITED STATES PATENT AND TRADEMARK OFFICE
CERTIFICATE OF CORRECTION

PATENT NO. : 12,412,104 B2  
APPLICATION NO. : 17/165240  
DATED : September 9, 2025  
INVENTOR(S) : Adam Russell et al.

Page 1 of 1

It is certified that error appears in the above-identified patent and that said Letters Patent is hereby corrected as shown below:

In the Claims

In Column 34, Line 27, Claim 7, delete "executed by:" and insert -- executed by the one or more processors, cause the one or more processors to perform operations comprising: --, therefor.

Signed and Sealed this  
Sixteenth Day of December, 2025

John A. Squires  
*Director of the United States Patent and Trademark Office*